United States Patent
Schueler et al.

(10) Patent No.: US 12,309,475 B2
(45) Date of Patent: *May 20, 2025

(54) MODULAR CAMERA

(71) Applicant: I&Eye Enterprises, LLC, Fairway, KS (US)

(72) Inventors: Jeremy R. Schueler, Columbia, IL (US); Grant S. Ray, Omaha, NE (US)

(73) Assignee: I&EyeEnterprises, LLC, Fairway, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,938

(22) Filed: Apr. 29, 2024

(65) Prior Publication Data

US 2024/0284024 A1  Aug. 22, 2024

Related U.S. Application Data

(63) Continuation of application No. 17/860,677, filed on Jul. 8, 2022, now Pat. No. 12,035,025.

(51) Int. Cl.
| | |
|---|---|
| *H04N 23/54* | (2023.01) |
| *G01F 23/296* | (2022.01) |
| *G03B 17/08* | (2021.01) |
| *H01M 50/202* | (2021.01) |
| *H01M 50/247* | (2021.01) |
| *H01M 50/296* | (2021.01) |

(Continued)

(52) U.S. Cl.
CPC ........... *H04N 23/54* (2023.01); *G01F 23/296* (2013.01); *G03B 17/08* (2013.01); *H01M 50/202* (2021.01); *H01M 50/247* (2021.01); *H01M 50/296* (2021.01); *H04N 23/56* (2023.01); *H04N 23/57* (2023.01); *H04N 23/66* (2023.01); *H01M 2220/30* (2013.01); *H04N 23/555* (2023.01)

(58) Field of Classification Search
CPC ........ H04N 23/54; H04N 23/56; H04N 23/57; H04N 23/66; H04N 23/555; H04N 23/65; H04N 23/51; G01F 23/296; G01F 23/0007; G01F 1/002; G01F 15/061; G01F 15/066; G01F 23/64; G01F 23/2961; G01F 23/804; G03B 17/08; H01M 50/202; H01M 50/247; H01M 50/296; H01M 2220/30

See application file for complete search history.

(56) References Cited

U.S. PATENT DOCUMENTS

| | | |
|---|---|---|
| 4,567,514 A | 1/1986 | Morgan et al. |
| 4,974,168 A | 11/1990 | Marx |

(Continued)

OTHER PUBLICATIONS

Browning; "Spec Ops Series" (webpage screenshot); Jun. 11, 2013; http://web.archive.org/web/20130611160456/http://browningtrailcameras.com/our-products/trail-cameras/spec-ops-series/.

(Continued)

*Primary Examiner* — Nasim N Nirjhar
(74) *Attorney, Agent, or Firm* — Martin & Associates, LLC; Derek P. Martin

(57) ABSTRACT

A modular camera includes a battery module, a camera module, and a lens module that can be connected together to make a water-tight camera suitable for monitoring wastewater in wet environments. The camera module includes multiple different external device interfaces that allow the camera to be directly connected to external power, a number of different analog and/or digital sensors, an auxiliary camera, and one or more control outputs.

18 Claims, 22 Drawing Sheets

(51) Int. Cl.
*H04N 23/50* (2023.01)
*H04N 23/56* (2023.01)
*H04N 23/57* (2023.01)
*H04N 23/66* (2023.01)

(56) References Cited

U.S. PATENT DOCUMENTS

| | | | |
|---|---|---|---|
| 7,002,620 B1 | 2/2006 | Rutledge | |
| 7,426,339 B2 | 9/2008 | Takanashi | |
| 7,626,508 B2 | 12/2009 | Kosuge et al. | |
| 7,715,701 B2 | 5/2010 | Lange | |
| 8,054,459 B2 | 11/2011 | Lindner | |
| 8,085,309 B1 | 12/2011 | Kelliher | |
| 8,087,311 B2 | 1/2012 | Merlo | |
| 8,243,984 B1 | 8/2012 | Brown et al. | |
| 8,381,593 B2 | 2/2013 | De Lorenzo et al. | |
| 9,756,231 B2 | 9/2017 | Freeman | |
| 10,602,040 B2 | 3/2020 | Freeman et al. | |
| 10,630,874 B2 | 4/2020 | Freeman et al. | |
| 11,300,855 B2 | 4/2022 | Freeman et al. | |
| 11,711,603 B1* | 7/2023 | Santos | H04N 23/665 |
| 2001/0005452 A1 | 6/2001 | Uchiyama et al. | |
| 2002/0140848 A1 | 10/2002 | Cooper et al. | |
| 2003/0101821 A1* | 6/2003 | Thomas | G01N 29/223 73/644 |
| 2003/0101831 A1 | 6/2003 | Thomas | |
| 2005/0091311 A1 | 4/2005 | Lund et al. | |
| 2006/0290779 A1 | 12/2006 | Reverte et al. | |
| 2007/0103324 A1 | 5/2007 | Kosuge et al. | |
| 2007/0106527 A1 | 5/2007 | McKinney | |
| 2007/0242134 A1 | 10/2007 | Zernov | |
| 2008/0210024 A1 | 9/2008 | Merlo | |
| 2009/0105969 A1 | 4/2009 | Saylor | |
| 2009/0110380 A1 | 4/2009 | Fantone et al. | |
| 2011/0148647 A1 | 6/2011 | Miller, II et al. | |
| 2011/0156917 A1 | 6/2011 | Wang et al. | |
| 2012/0305458 A1 | 12/2012 | Jensen et al. | |
| 2013/0335550 A1 | 12/2013 | Rochenski et al. | |
| 2014/0038458 A1 | 2/2014 | Bausch | |
| 2014/0241616 A1 | 8/2014 | Medvedovsky et al. | |
| 2014/0320697 A1 | 10/2014 | Lammers et al. | |
| 2014/0324406 A1 | 10/2014 | Nesbitt et al. | |
| 2015/0229785 A1 | 8/2015 | Choi | |
| 2015/0338315 A1 | 11/2015 | Manahan et al. | |
| 2015/0339407 A1 | 11/2015 | Gallo et al. | |
| 2016/0042532 A1 | 2/2016 | Lo et al. | |
| 2016/0203398 A1 | 7/2016 | Meyer et al. | |
| 2017/0248835 A1 | 8/2017 | Freeman | |
| 2018/0088443 A1* | 3/2018 | Riddiford | G03B 11/06 |
| 2019/0122354 A1 | 4/2019 | Hewes et al. | |
| 2019/0339150 A1* | 11/2019 | Schiavone | G01N 21/8507 |
| 2022/0053142 A1 | 2/2022 | Manzari | |
| 2022/0275899 A1* | 9/2022 | Evans | F16L 55/105 |
| 2022/0392247 A1 | 12/2022 | Kudo | |

OTHER PUBLICATIONS

Browning; "Timelapse View Plus" (webpage screenshot); Jun. 22, 2013; http://web.archive.org/web/20140515022034/http://browningtrailcameras.com/our-products/trail-cameras/timelapse-viewer-plus/.

Browning; "Product Instructions" (webpage screenshot); Jan. 10, 2014; http://web.archive.org/web/20140110094943/http://browningtrailcameras.com/customer-service/product-instructions/.

Browning; "Instruction Manual"; PDF Linked from Jan. 10, 2014 web.archieve.org, http://browningtrailcameras.com/wp-content/uploads/2012/10/Spec-Ops-user-manual-med-res.pdf.

Montgomery, M.; Time Lapse Video; Feb. 1, 201 O; https://www.videomaker.com/article/c3/14612-time-lapse-video; pp. 1-9.

Microsoft; "how do I use a circle to identify a player in a sports video made with movie maker"; Sep. 7, 2012; http ://answers.microsoft.com/en-us/windowslive/forum/moviemaker-av/how-do-i-use-a-circle-to-identify-a-player-in-a/54491480-9721-4825-a0a1-9d159703370b; pp. 1-7.

Stackoverflow.com; "how can I quantify difference between two images?"; Oct. 10, 2008; http://stackoverflow.com/questions/189943/how-can-i-quantify-difference-between-two-images?answertab=votes#tab-top.

BriefCam, Rapid Video Review: Benefits and Payoff, printed from http://briefcam.com/lorem-ipsum-dolor-sit-amet-consectetur-adipiscing-elit/ on Jan. 14, 2017.

* cited by examiner

| Sample Photo Categories | 1700 |
|---|---|
| Low Flow | 1710 |
| Intermediate Flow | 1720 |
| High Flow | 1730 |
| Inflow Detected | 1740 |
| Contamination Detected | 1750 |
| Object(s) Detected | 1760 |
| Color Change Detected | 1770 |
| Overflow | 1780 |
| Blockage | 1790 |

FIG. 17

| Sample Alarms | 1800 |
|---|---|
| Intermediate Flow Detected | 1810 |
| High Flow Detected | 1820 |
| Inflow Detected | 1830 |
| Contamination Detected | 1840 |
| Object(s) Detected | 1850 |
| Overflow Detected | 1860 |
| Blockage Detected | 1870 |

FIG. 18

| Sample Alarm Actions | 1900 |
|---|---|
| Change Photo Interval | 1910 |
| Change Data Sampling Interval | 1920 |
| Send Message Corresponding to Alarm | 1930 |
| Send Photos Real-time | 1940 |
| Activate Pump | 1950 |
| Activate Gate | 1960 |

FIG. 19

| Dual Camera Application Examples | 3000 |
|---|---|
| Two Cameras Monitor Two Different Pipes in Manhole | 3010 |
| Two Cameras Monitor Two Different Angles in Manhole | 3020 |
| Two Cameras with Different Focal Lengths in Manhole | 3030 |
| Two Cameras Used as Stereoscopic Camera for Depth Perception and 3D in Manhole | 3040 |
| One Color Camera and One Thermal Camera, Overlay Thermal Image over the Color Image for Contour Lines | 3050 |
| One Color Camera, One IR Camera | 3060 |

FIG. 30

| Monitoring Application Examples | 3100 |
|---|---|
| Monitor Storm Sewers | 3110 |
| Monitor Sanitary Sewers | 3115 |
| Monitor Combined Sewers | 3120 |
| Monitor CSOs | 3125 |
| Monitor SSOs | 3130 |
| Monitor Stormwater Outlets/Outfalls for Illicit Discharge Upstream | 3135 |
| Determine Flow from Thel-mar Volumetric Weir | 3140 |
| Confirm Pump Station Activity | 3145 |
| Confirm Outflows | 3150 |
| Monitor Drainage Ditches | 3155 |
| Monitor Water at Retaining Wall(s) | 3160 |
| Monitor Bridges to Create a Timelapse of Imagery to Detect Cracks, Spalling and Delamination Underneath Outermost Layer of Asphalt | 3165 |
| Monitor Electrical Distribution Systems for Hot Spots at Peak Load | 3170 |

FIG. 31

MODULAR CAMERA

BACKGROUND

1. Technical Field

This disclosure generally relates to cameras, and more specifically relates to a modular camera that is well-suited for wastewater monitoring.

2. Background Art

Many different systems have been developed over the years for monitoring or inspecting the interior of a pipe. For example, U.S. Pat. No. 8,087,311 issued on Jan. 3, 2012 to Stephen A. Merlot discloses a system that includes multiple cameras attached to an interior surface of a pipe that are connected to a data communication network so the data from the camera may be transmitted over the data communication network. A computing device in a remote location receives the data transmitted over the data communication network by the cameras.

The system disclosed in the Merlo patent referenced above requires a constant connection between the cameras and a remote computer system. In addition, the Merlo system is relatively expensive. What is needed is a modular camera for monitoring levels in a wastewater pipe that is inexpensive, simple to use and powerful.

BRIEF SUMMARY

A modular camera includes a battery module, a camera module, and a lens module that can be connected together to make a water-tight camera suitable for monitoring wastewater in wet environments. The camera module includes multiple different external device interfaces that allow the camera to be directly connected to external power, a number of different analog and/or digital sensors, an auxiliary camera, and one or more control outputs. The camera module includes an artificial intelligence (AI) photo analysis tool that analyzes photographs taken by the camera based on an AI model to automatically categorize each photo in near real-time, thereby allowing the camera itself to detect alarm conditions based on an assigned category for a photo, to take action in response to the alarm, and optionally to activate one or more external devices in response to the alarm.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 17 is a table showing sample photo categories that could be defined in an AI model;

FIG. 18 is a table showing sample alarms for the camera;

FIG. 19 is a table showing sample alarm actions for the camera;

FIG. 30 is a table showing application examples for dual modular cameras; and

FIG. 31 is a table showing monitoring application examples for the modular camera.

DETAILED DESCRIPTION

Figure 1:
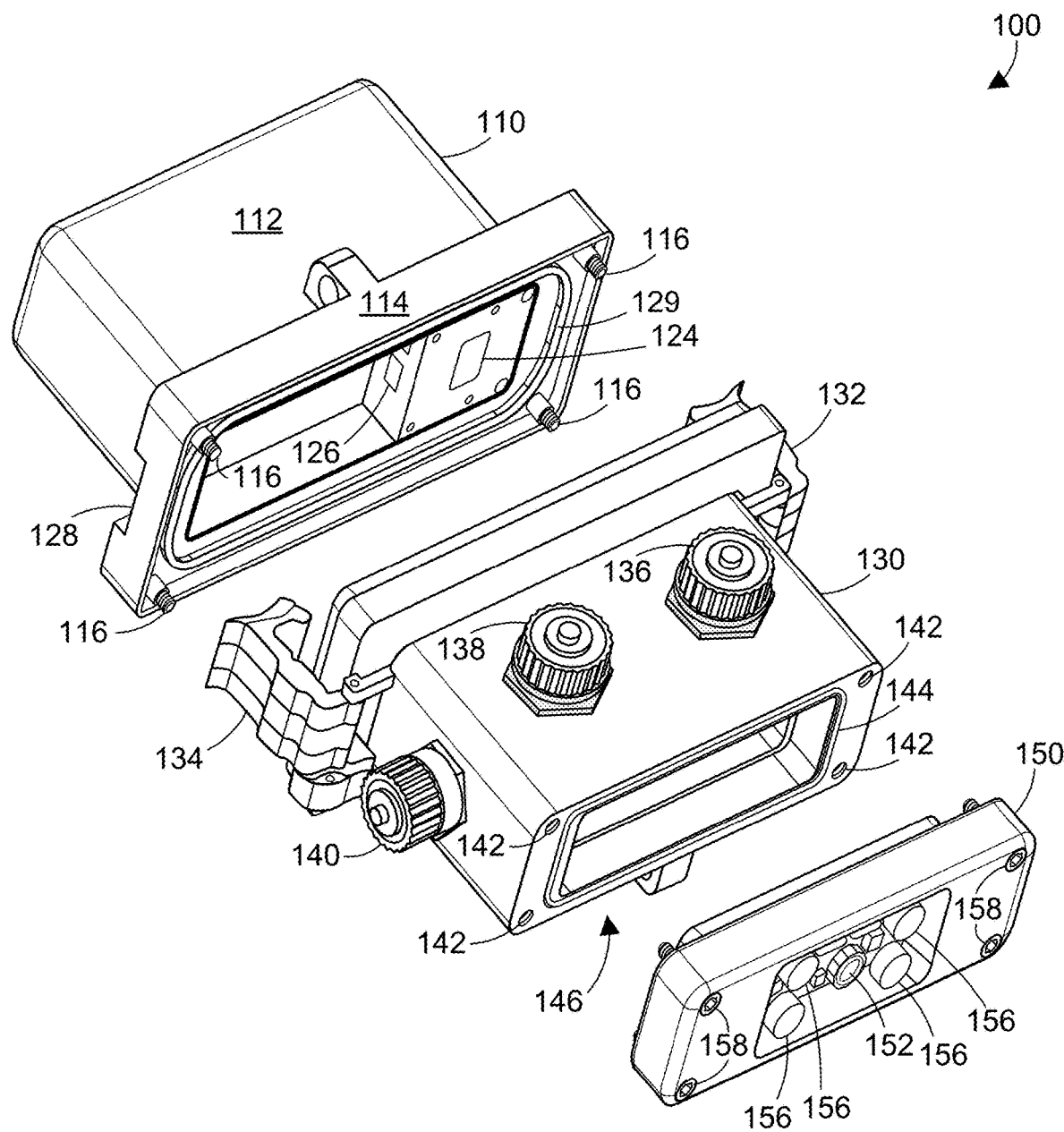
FIG. 1 is an exploded perspective view of a modular camera for wastewater monitoring that includes three different modules.

Most municipalities have separate systems for storm drains and for sewer. Sewage from homes and businesses typically runs in sewage pipes to a sewage treatment plant, which treats the sewage and outputs clean water. Storm water systems typically receive runoff from rainstorms and direct the storm water to a holding basin, to a neighboring river or creek, etc. Because storm water is typically runoff from a storm, it typically does not contain sewage or other impurities that require significant treatment. As a result, storm water can often be returned to natural water sources such as creeks or rivers without treatment.

While sewer systems and storm water systems are designed to be separate, sometimes leaks can develop between the two. If storm water leaks into a sewage pipe, the result may be volumes of flow that exceed the design parameters of the sewage pipe. This can cause sewage systems to back up, and can also cause excessive flows to the sewage treatment plant.

Detecting when storm water leaks into a sewage pipe is not a simple or straight-forward process. The degree of the leak can obviously depend on the amount of runoff generated by a storm. Because storms that generate significant runoff are not daily events, a monitoring system must be able to monitor a location of interest for long periods of times, typically spanning several days or weeks. Many of the known systems for monitoring water levels in pipes are sophisticated and expensive. Small municipalities that have issues with storm water leaking into sewage pipes typically do not have the funds to invest in known sophisticated and expensive monitoring systems. For example, U.S. Pat. No. 8,087,311 issued on Jan. 3, 2012 to Stephen A. Merlot (discussed above in the Background Art section) discloses a system that includes multiple cameras attached to an interior surface of a pipe that are connected to a data communication network so the data from the camera may be transmitted over the data communication network. A computing device in a remote location receives the data transmitted over the data communication network by the cameras. Needless to say, installing multiple cameras in a pipe and installing a communication network is an expensive process. What is needed is a simple and inexpensive way to monitor water level in a pipe over days or weeks. The disclosure and claims herein provide a modular camera that can detect water level in a pipe without the complexity and expense of known systems.

A modular camera includes a battery module, a camera module, and a lens module that can be connected together to make a water-tight camera suitable for monitoring wastewater in wet environments. The camera module includes multiple different external device interfaces that allow the camera to be directly connected to external power, a number of different analog and/or digital sensors, an auxiliary camera, and one or more control outputs. The camera module includes an artificial intelligence (AI) photo analysis tool that analyzes photographs taken by the camera based on an AI model to automatically categorize each photo in near real-time, thereby allowing the camera itself to detect alarm conditions based on an assigned category for a photo, to take action in response to the alarm, and optionally to activate one or more external devices in response to the alarm.

Figure 2:
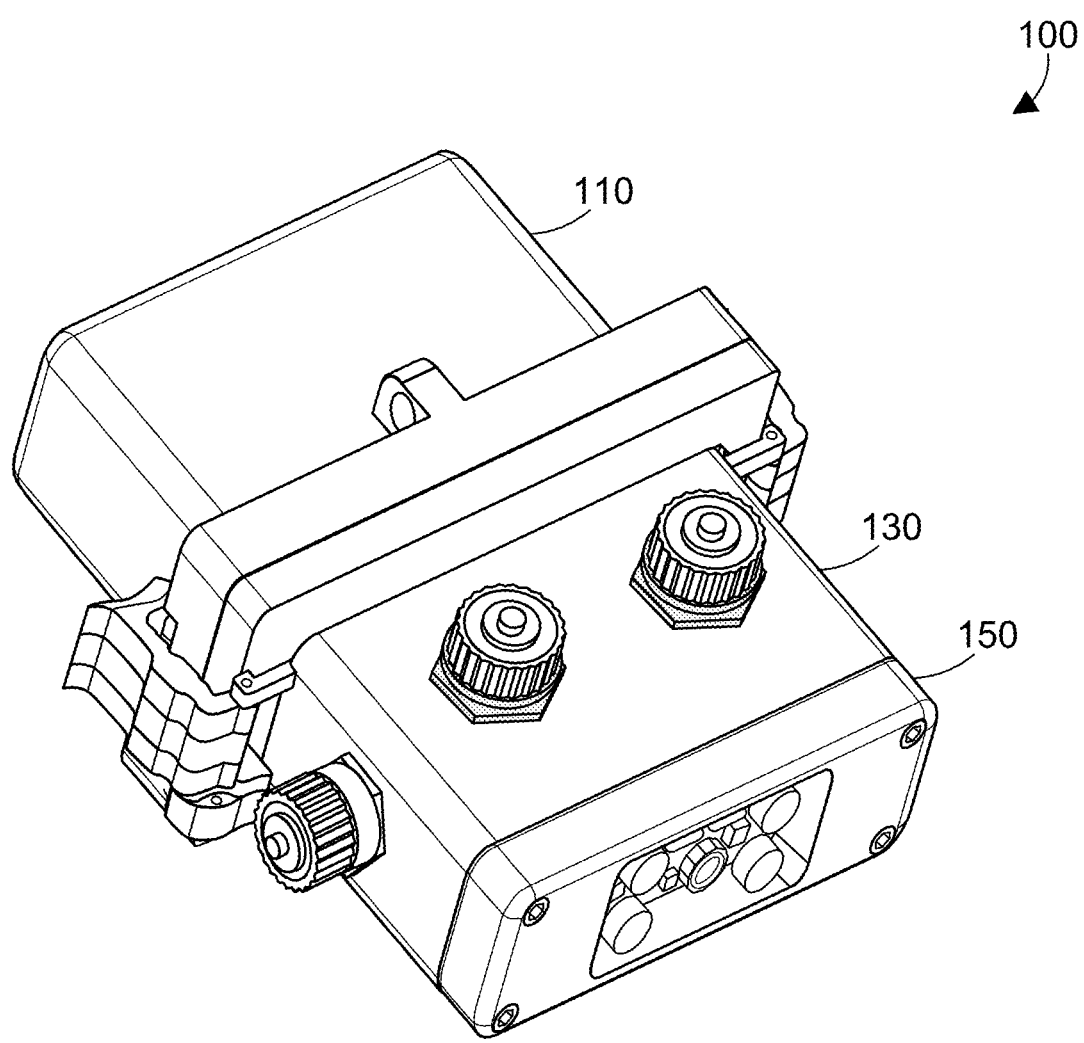
FIG. 2 is a perspective view of the camera shown in FIG. 1 when the three modules are connected together to form a water-tight camera.

Referring to FIGS. 1 and 2, a modular camera 100 is comprised of three modules, a battery pack module 110, a camera module 130, and a camera face module 150. The three modules are shown unconnected in the exploded view in FIG. 1 and are shown connected together in the view in FIG. 2. The view in FIG. 2 does not include some of the details and reference designators in FIG. 1 for the sake of simplicity in showing the three modules 110, 130 and 150 connected together. Referring again to FIG. 1, the battery pack module 110 includes a battery housing 112 that contains a battery, where the battery housing 112 is coupled to a mounting flange 114. The camera module 130 provides an interface to the battery pack module 110 that includes a first water-tight connection for removably coupling the battery pack to the camera module. The battery within the battery housing 112 can include any suitable direct current (DC) power source from any suitable battery chemistry or technology. The battery could be single-use, but in the preferred embodiments is a rechargeable lithium-ion battery. The battery preferably provides sufficient power for the camera 100 to function taking photographs for days, weeks or months without interruption. The term "battery" as used herein expressly includes any suitable type and size of commercially-available batteries, as well as battery types, forms and factors not yet known.

Figure 3:
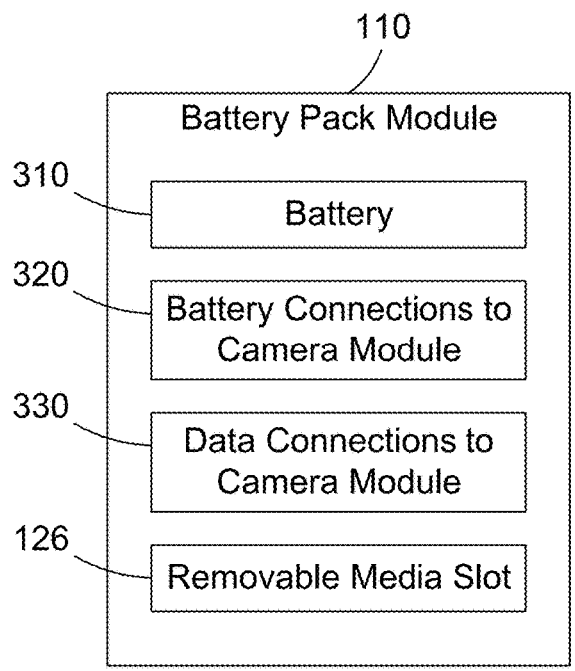
FIG. 3 is a block diagram of one suitable implementation for the battery pack module shown in FIGS. 1 and 2.

The mounting flange 114 includes four alignment posts 116 that align the battery pack module 110 to the camera module 130 so the connector 124 on the battery pack module 110 will connect properly to the mating connector on the camera module 130. The connector 124 preferably provides power from the battery pack module 110 to the camera module 130, and also preferably provides data connections between the camera module 130 and a removable media slot 126 in the battery pack module 110 so the photos taken by the camera module 130 may be stored on removable media coupled to the removable media slot 126 in the battery pack module 110. One suitable example for the removable media slot 126 is a Universal Serial Bus (USB) port that can receive, for example, a thumb drive. Another suitable example for the removable media slot 126 is a card slot for receiving a Secure Digital (SD) card or Micro-SD card. All suitable types of removable media and corresponding slots are within the scope of the disclosure and claims herein, whether currently known or developed in the future. Putting the removable media slot 126 on the battery pack module 110 provides a significant advantage, because replacing the battery pack module 110 with a freshly charged battery pack module results in retrieving the removable media in the removable media slot 126 at the same time. Thus, the two distinct steps of replacing the battery pack module and retrieving the photos on the removable media connected to the removable media slot 126 are combined into a single step, thereby saving time and making retrieval of the photos from the camera much easier. The battery pack module 110 includes a rubber gasket 129 that seals the battery pack module 110 to the camera module 130 in a water-tight manner once the two are properly connected together. Referring to FIG. 3, the battery pack module 110 preferably includes a battery 310, battery connections to the camera module 320 (e.g., via connector 124), data connections to the camera module 330 (e.g., via connector 124), and the removable media slot 126.

Providing removable media coupled to the removable media slot 126 allows some powerful applications. For example, any suitable information besides photos could also be stored as a backup on the removable media coupled to the removable media slot 126. Examples of information that could be stored on the removable media in the removable media slot 126 in the battery pack module 110 could include (referring to FIG. 6) camera operational logic 630, user interface 660, AI photo analysis tool 670 with its corresponding AI model(s) 672, and camera settings 674. Should the camera module 130 fail, a new camera module could be installed in its place, and the newly-installed camera module could then configure itself using the backed-up settings on the removable media in the removable media slot 126 in the battery pack. In a different application, let's assume several cameras are being installed in several manholes in a particular area. For a first manhole, a user could setup via the user interface all the relevant operating conditions and parameters of the camera module until the camera module in the first manhole is working as desired. The user could then specify to backup the configuration of the camera module onto a thumb drive coupled to the removable media slot 126 in the attached battery pack. The user can then remove the thumb drive that has the configuration of the camera module in the first manhole from the battery pack module, then install a new thumb drive in the battery pack module that can receive photos and/or configuration or other backup information. Now the user can go to the second manhole, install the camera, and install the thumb drive from the first manhole into the battery pack used in the second manhole. The user can then specify to copy the camera configuration info from the thumb drive in the battery pack, thereby allowing the user to create a clone of the first camera module very easily instead of having to setup all the operational parameters for the second camera module in the second manhole. Providing a removable storage device coupled to the removable media slot 126 in the battery pack module 110 allows easy transportability of photos, data, or any suitable information, including executable code, from one camera to a different camera or to an external system.

The camera module shown in FIG. 1 includes pivoting clips 132 and 134 for connecting the battery pack module 110 to the camera module 130. Each clip engages a corresponding recess on the battery pack module 130 to lock the battery pack module 130 into place. In FIG. 1, this is shown by the recess 128 on the flange 114 of the battery pack module 110, which receives and holds in place the clip 134 on the camera module. It is understood the clip 132 on the other side of the camera module 130 will engage another slot not shown in FIG. 1 on the other side of the battery pack module 130. The camera module 130 thus includes a battery pack interface on a back portion of the camera module that includes a first water-tight connection for removably coupling the battery pack to the camera module. The camera module 130 includes connectors 136, 138 and 140 that may be connected to external devices, such as a cable dongle for powering up and configuring the settings for the camera module 130, an external digital or analog sensor, an antenna for wireless or cell phone network communications, a second camera, etc. Connectors 136, 138 and 140 preferably include water-tight covers when not connected, as shown in FIGS. 1 and 2. In the preferred implementation, two of the three connectors 136, 138 and 140 are 10-pin connectors and the third is an 8-pin connector, providing 28 total pins for connecting a variety of different devices to the camera module 130. The front face of the camera module 130 includes threaded holes 142 and a rubber gasket 144 that provide a camera face interface 146 on a front portion of the camera module that includes a water-tight connection for removably coupling the camera face module 150 to the camera module 130. Once the screws in the camera face module 150 are screwed into the threaded holes 142, the rubber gasket 144 seals the connection between the camera module 130 and the camera face module 150 in a water-tight manner. Thus, once all three modules 110, 130 and 150 are coupled together as shown in FIG. 2, the resulting camera 100 is a water-tight assembly that can be used in wet environments, such as wastewater monitoring environments.

Figure 4:
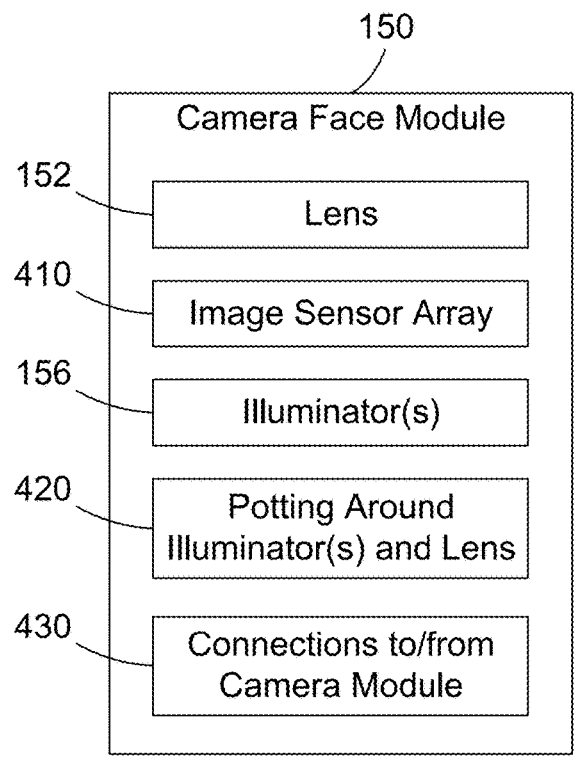
FIG. 4 is block diagram of one suitable implementation for the camera face module shown in FIGS. 1 and 2.

The camera face module 150 includes a lens 152, one or more illuminators 156, and screws 158 for attaching the camera face module 150 to the camera module 130. As shown in FIG. 4, the camera face module 150 preferably includes a lens 152, an image sensor array 410, illuminator(s) 156, potting around the illuminator(s) and lens 420, and connections 430 to/from the camera module. The connections 430 to/from the camera module include a connector that mates to camera face connector 698 shown in FIG. 6 in the camera module 130. The two connectors that connect the camera face module 150 and the camera module 130 can be any suitable type of connector. In the most preferred embodiment, the connectors are circuit board connectors that mate together when the camera face module 150 is attached to the camera module 130. The connections 420 provided by these connectors preferably include data connections that connect the image sensor array 410 to the camera module 130, as well as control connections that allow the camera module 130 to illuminate the illuminator(s) 156. The potting 410 in FIG. 4 has been intentionally omitted in FIGS. 1 and 2 so the lens 152 and illuminators 156 are clearly visible. The potting 410 is most preferably an epoxy-type potting material around the lens 152 and illuminator(s) 156. The potting 410 most preferably does not cover the camera lens 152 or illuminator(s) 156, but simply waterproofs around these components. The illuminator(s) 156 are preferably high power light-emitting diodes (LEDs) that preferably have a combined 900 lumen output.

The lens 152 can be any suitable type or size of lens, but is preferably a small fixed-focus high-resolution lens that is lightweight while providing excellent photo quality. The lens 152 directs an image to be taken as a photo onto the image sensor array 410. The image sensor array 410 is a sensor array that is used to take a digital photograph as is known in the art, such as a CMOS sensor array. The combination of the lens 152 and the image sensor array 410 define a type of camera. Suitable camera types are shown in table 500 in FIG. 5 to include a standard color camera 510, a wide angle color camera 520, a thermal camera 530, an infrared camera 540, and dual image sensors 550 to provide stereoscopic vision that allows seeing depth and three dimensions. The illuminator(s) 156 are preferably one or more light sources that can serve to illuminate a location of interest. Examples of suitable light sources include one or more light-emitting diodes (LEDs), which may include infrared LEDs, white LEDs, color LEDs, etc. White or color LEDs may be the type of illuminator(s) 156 when the camera is a color photo. Infrared LEDs may be the type of illuminator(s) 156 when the camera is an infrared camera that takes black-and-white photos. The illuminator(s) 156 are important in wastewater monitoring because wastewater pipes typically do not have sufficient light for a photograph without using an illuminator. While four illuminators 156 are shown in the figures and discussed herein, one skilled in the art will appreciate that any number and type of illuminator could also be used, including any suitable source of light.

The specific configuration in FIGS. 1 and 2 shows a clip-on connection between the battery pack module 110 and the camera module 130, and a screw-on connection between the camera face module 150 and the camera module 130. These are shown by way of example. Any and all water-tight interfaces between the battery pack module 110 and the camera module 130 and between the camera module 130 and the camera face module 150 are within the scope of the disclosure and claims herein. Furthermore, it is also within the scope of the disclosure and claims herein to provide a camera and lens/illuminator in the same module, making a two-module system that allows for easily removing and replacing the battery pack module.

The camera 100 with three distinct modules 110, 130 and 150 that can be connected together via water-tight connections provides significant advantages for the specific application of wastewater monitoring. Wastewater applications are typically in manholes that may be in various different locations. This means the battery pack module 110 will need to be periodically replaced with a fresh battery pack module. Because the removable media slot 126 is within the water-tight seal between the battery pack module 110 and the camera module 130, the removable media that is attached to the removable media slot 126 need not be media that can survive in a wet environment. Because the removable media slot 126 is part of the battery pack module 110, removing the battery pack module 110 results in also removing a removable media device that is connected to the removable media slot 126. Thus, replacing the battery pack module 110 also automatically results in retrieving the photos that were taken by the camera that are stored on the removable media coupled to the removable media slot 126, resulting in one action accomplishing two desired results.

Figure 6:
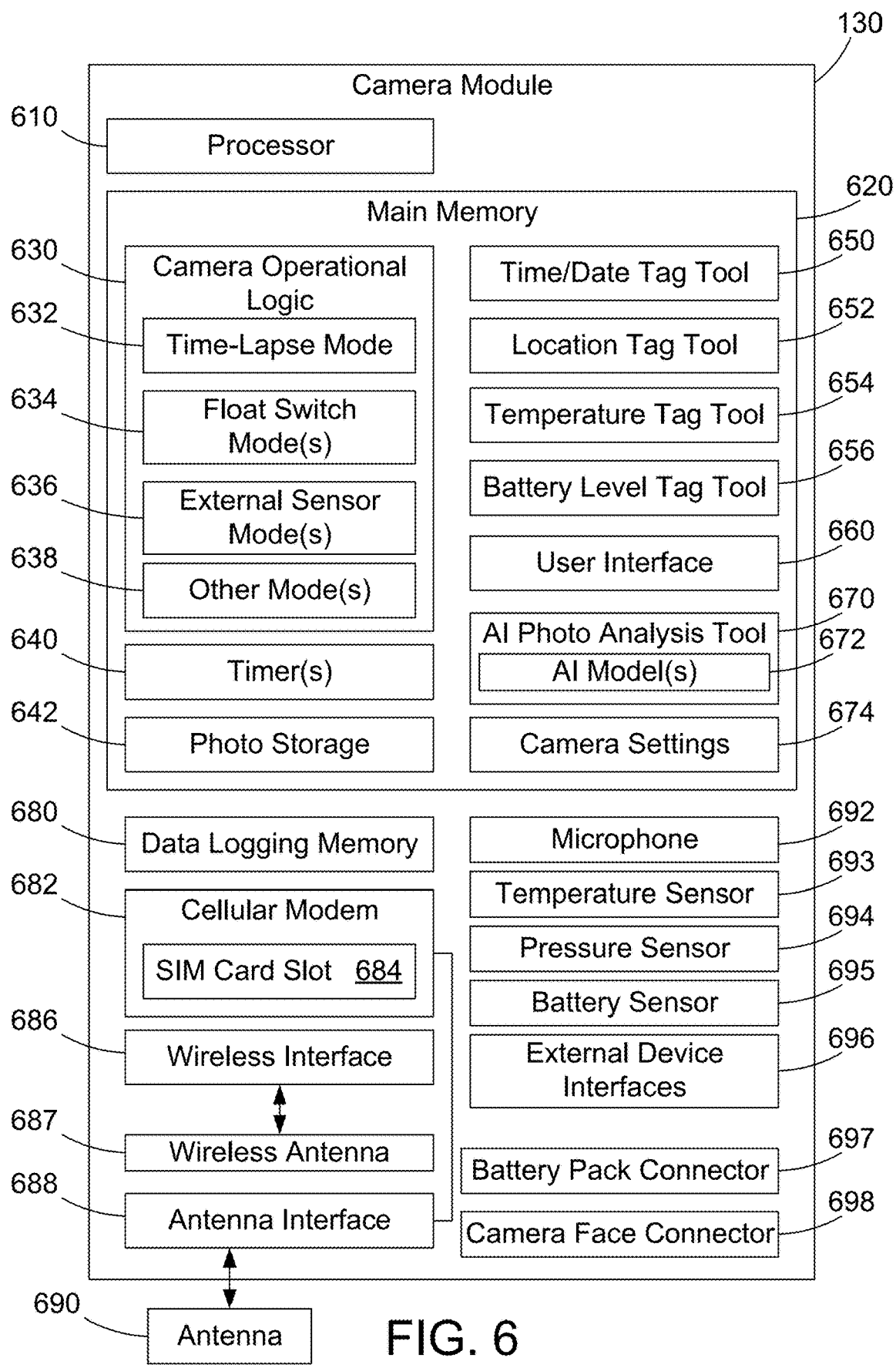
FIG. 6 is a block diagram showing possible components in the camera module shown in FIGS. 1 and 2.

The battery pack module 110 connects electrically with the camera module 130 via connector 124 shown in FIG. 1 that mates with a corresponding battery pack connector 697 in the camera module that is not shown in FIGS. 1 and 2, but is shown in FIG. 6. Similarly, the camera face module 150 connects electrically with the camera module 130 via a camera face connector 698 on the camera module 130 that mates with a corresponding connector on the camera face module 150. These connectors can be any suitable type of connector, whether currently known or developed in the future. For example, the connectors can have a female portion with sockets and a male portion with pins that mate to the female portion when the pins of the male portion are pressed into the sockets in the female portion. In another example, the connectors could have a female portion that includes solder contacts on a printed circuit board and a male portions with pins or contacts that press against the solder contacts when two of the modules are connected together. The electrical connections between modules may be made using any suitable type of connector within the scope of the disclosure and claims herein.

Known water-tight cameras, such as Go Pro cameras, provide minimal connections between the camera and external devices because such connections must be waterproof, and additional connections increase the chance of water leakage into the camera. The connections between the battery, camera and lens in known waterproof cameras is typically within a single waterproof housing, allowing the interior of the housing to be potted to make the electronics water-proof. Typically the only connection on the outside of known waterproof cameras is a single waterproof connector that allows charging the internal battery or retrieving the photos from the camera. The modular camera 100 disclosed herein thus goes against conventional wisdom in waterproof cameras by providing three different modules that are connected together via water-tight interfaces to provide a camera that is much better suited to wastewater monitoring by providing a removable battery pack module that can be easily replaced without tools as needed, and by providing a removable camera face module that allows different types of camera face modules to be used depending on the application.

Possible features of the camera module 130 are shown in FIG. 6. The camera module 610 preferably includes a processor 610; a main memory 620; a data logging memory 680; a cellular modem 682; a wireless interface 686; a wireless antenna 687; an antenna interface 688; a microphone 692; a temperature sensor 693; a pressure sensor 694; a battery sensor 695; external device interfaces 696; a battery pack connector 697; and a camera face connector 698. The processor 610 provides the processing and control functions of the camera module 130. In one specific implementation, the processor 610 is preferably a Raspberry Pi. The main memory 620 includes camera operational logic 630; one or more timers 640; a photo storage 642; a time/date tag tool 650; a location tag tool 652; a temperature tag tool 654; a battery level tag tool 656; a user interface 660; an artificial intelligence (AI) photo analysis tool 670; and camera settings 674. The camera operational logic 630 is preferably software that is executed by the processor 610, but could be any suitable combination of hardware and software to provide the needed functions. The camera operational logic 630 can include both an operating system as well as an application running under control of the operating system. The camera operational logic 630 preferably defines multiple different modes of operation for the camera module 130. Suitable examples of modes of operation include a time-lapse mode 632, one or more float switch modes 634, one or more external sensor modes 636, and one or more other modes 638. The time-lapse mode 632 takes a photograph at a defined time interval. The time interval can change according to any suitable detected condition, including conditions external to the camera. In general, the time-lapse mode 632 defines a base time interval that is a frequency for taking photos when the detected flow of wastewater is low, and increases the frequency for taking photos as the flow increases. The float switch mode(s) 634 can include multiple frequencies for taking photos according to the state of one or more float switches that measure the level of wastewater. The float switch mode(s) can also define alarms that can cause the camera module 130 to send a message to a suitable device external to the camera module 130, such as a device coupled to the camera via cellular modem 682, a device coupled to the wireless interface 686, and/or a device coupled to the camera via a wired connector. In similar fashion, the external sensor mode(s) can also define alarms. When the camera operational logic detects an alarm, any suitable message can be sent, including one or more text messages, one or more emails, or other types of messages. The other mode(s) 638 can include any suitable mode of operation that is possible using the components shown in the camera module.

The timer(s) 640 can include either hardware timers, software timers, or both. Timers 640 can be used, for example, to define a time interval in the camera operational logic 630 so the camera module 130 will take one photograph automatically each defined time period, such as five minutes. Photo storage 642 is a location in the main memory 620 where photos taken by the camera module are stored. The photo storage 642 is preferably 30 GB, which can store approximately 7,500 photos at 5 megapixel (2592×1944 pixels) resolution. Of course, more photos can be stored in the photo storage 642 when the photos are at a lower resolution.

A time/date tag tool 650 allows superimposing the time and date of a photo on the visible image portion of the photo itself, in addition to adding the time and date of the photo to metadata relating to the photo. A location tag tool 652 allows superimposing the location of the camera on the visible image portion of the photo itself, in addition to adding the location of the camera to metadata relating to the photo. Note the location can be in any suitable format, including GPS coordinates, an address, a manhole number, a location identifier, etc. A temperature tag tool 654 allows superimposing the temperature of the camera or the temperature of the water monitored by the camera on the visible image portion of the photo itself, in addition to adding the temperature to metadata relating to the photo. The visible temperature information could be a numerical value or other representation of temperature. The temperature tag tool 654 could read the temperature from the temperature sensor 693, which could be a temperature sensor within the camera module 130 that senses the ambient temperature within the camera module 130, or could be a laser-type temperature sensor that directly measures the temperature of water in the wastewater pipe. A battery level tag tool 656 allows superimposing the battery level of the battery in the battery pack module detected by the battery sensor 695 on the visible image portion of the photo itself, in addition to adding the battery level to metadata relating to the photo.

A user interface 660 provides a graphical user interface for a user to configure and interact with the camera module 130. The user interface 660 provides a very easy and convenient way to configure and setup the camera module 130. The user interface 660 allows the user to setup the camera module 130 to a desired mode of operation by defining the camera operational logic 630, such as taking a photograph automatically every five minutes, or functioning in response to float switches or other external sensors. The user interface 660 can optionally include a display that allows viewing a photo captured by the camera, or viewing a video that shows what the camera sees, which can be very helpful when initially installing the camera.

The AI photo analysis tool 670 can process photos taken by the camera module 130 using one or more AI models 672. The AI model 672 can be a general model to start with, and can then be modified and refined as time goes on, as explained in more detail below with respect to FIGS. 14 and 15. The AI photo analysis tool 670 allows processing the photos taken by the camera module 130 to determine a corresponding category or categories for each photo in near real-time. The term "near real-time" as used herein means the photo is analyzed by the camera to assign a corresponding category for the photo as soon as possible after the photo is taken. The AI photo analysis tool 670 can thus automatically assign a photo to one or more categories using artificial intelligence. When one of the categories has a corresponding alarm, the camera module 130 can perform functions relating to the alarm as soon as the alarm condition is detected according to the assigned category of the photo. The near real-time analysis of photos within the camera module itself to categorize the photo and the near-immediate performing of corresponding alarm functions allows the camera itself to detect and act on alarm conditions without waiting for an external computer system or a human operator to take action in response to an alarm notification.

Figure 8:
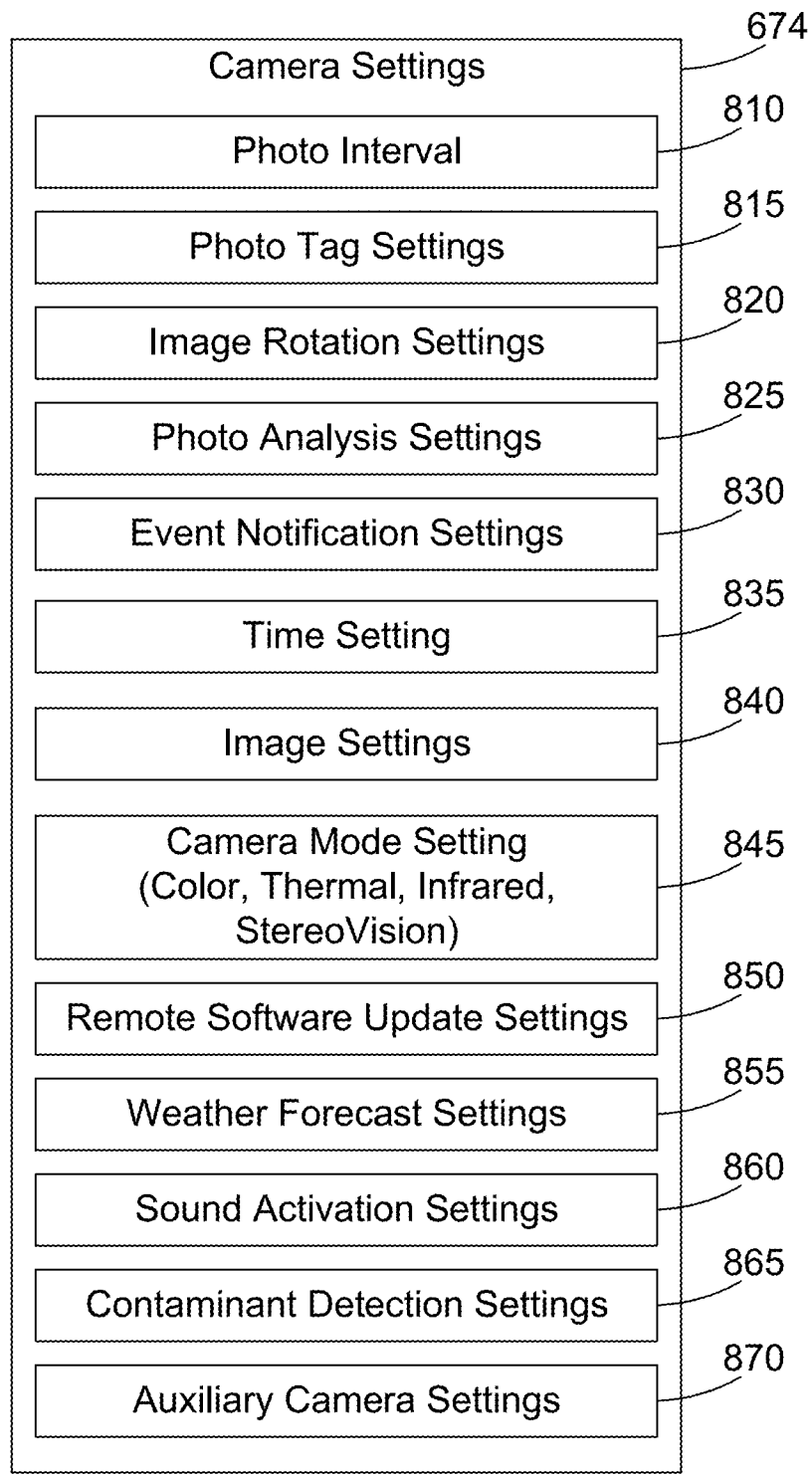
FIG. 8 is a block diagram showing possible camera settings for the camera module.

The camera settings 674 include settings that define how the camera module 130 functions. Sample camera settings are shown in FIG. 8 and are discussed in more detail below.

The data logging memory 680 is a memory where data from any sensor or device attached to the camera module 130 can be stored. The data logging memory 680 could be a part of the main memory 620, but is most preferably a separate memory. In one specific implementation, the data logging memory 680 could be a removable memory device coupled to the removable media slot 126 in the battery pack module 110. In applications where the camera module 130 has on-demand communication with an external device, such as a system control server 1320 shown in system 1300 in FIG. 13, the data logging memory 680 may not be used because the data logging could be uploaded at any time to the system control server 1320. However, if the communication link to the system control server 1320 goes down, or if the installation is such that no on-demand communication is available, the data logging memory 680 can log the sensor data in the data logging memory for analysis later on.

The cellular modem 682 provides a wireless interface to a cell phone network. A SIM card slot 684 is preferably compatible with SIM cards from all over the world, including most carriers in the United States, thereby allowing the camera module 130 to connect to a cell phone network that covers the location where the camera is installed.

The wireless interface 686 can include any suitable wireless interface to any suitable type of wireless network, including a Bluetooth interface, a Wi-Fi interface, or any other suitable wireless interface. The wireless interface 686 is preferably connected to a wireless antenna 687 internal to the camera module 130. The antenna interface 688 is connected to an antenna 690 that is connected to the camera module 130. The antenna interface 688 and antenna 690 can provide antenna-based communications to the cellular modem 682.

The microphone 692 can optionally be used to change function of the camera module 130. For example, let's assume the camera operational logic 630 is initially setup to take a photograph every five minutes in time-lapse mode 632. Let's further assume the camera monitors the ambient sound level using microphone 692. When the ambient sound level detected by the microphone 692 exceeds some specified threshold, which could indicate rushing water in the pipe, the camera function could change to take a photograph every minute instead of every five minutes. Because the camera module 130 is used to monitor level of water in a pipe, and because water makes noise as it passes through a pipe, a change in the volume level detected by the microphone 692 on the camera module 130 can indicate a change in the water level in the pipe, and could thus be used to change the function of the camera as desired or to tag one or more photographs according to detected sound levels.

The pressure sensor 694 could be used to detect when the pressure at the camera increases. This could happen, for example, when the system backs up and overflows through the manhole covers. The pressure sensor 694 allows the camera to detect when the pressure surrounding the camera increases, thereby allowing the camera to alter its function, send an alarm, etc.

The battery sensor 695 senses the level of the battery in the battery pack module 110. The level of the battery can be reported in any suitable manner, such as a percentage from 1-100% of full charge, a bar graph, a bracketed value (such as 25%, 50%, 75% and 100%), or in any other suitable way.

The battery pack connector 697 is the connector on the camera module 130 that mates with a corresponding connector (such as 124 in FIG. 1) in the battery pack module 110. The battery pack connector 697 provides the electrical connections between the camera module 130 to one or both of the battery connections 320 and data connections 330 in the battery pack module 110 as shown in FIG. 3. The camera face connector 698 is the connector on the camera module 130 that mates with a corresponding connector in the camera face module 150. The camera face connector 698 provides the connections to/from the camera module 430 to the image sensor array 410 and to the illuminator(s) 146 in the camera face module 150 as shown in FIG. 4. This allows the camera module 130 to receive the images taken by the image sensor array 410 and to illuminate the illuminator(s) 156 in the camera face module 150 when needed. When the camera 100 is installed in a dark location such as a manhole, the illuminator(s) 156 will be illuminated each time a photo is taken by the camera 100.

Note that a suitable digital camera need not include all of the features shown in FIG. 6. A subset of these features could be used, depending on the specific implementation.

Figure 7:
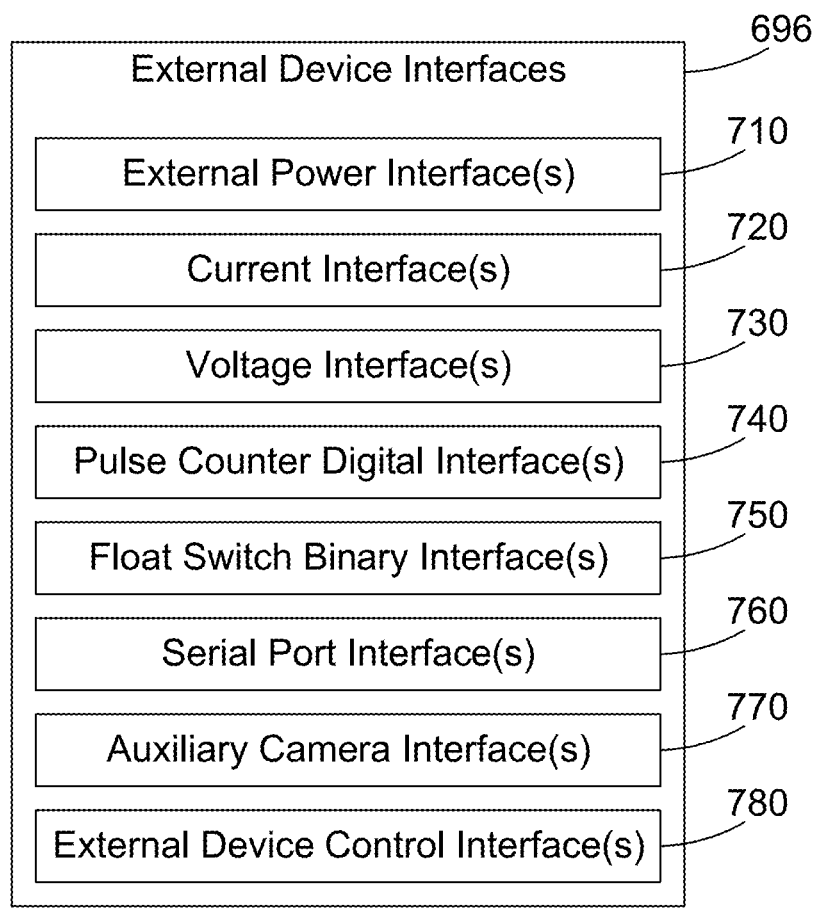
FIG. 7 is a block diagram showing examples of possible external device interfaces shown in FIG. 6.

External device interfaces 696 include any and all suitable connections to any device external to the camera 100. Suitable examples for external device interfaces 696 are shown in FIG. 7 to include one or more external power interfaces 710; one or more current interfaces 720; one or more voltage interfaces 730; one or more pulse counter digital interfaces 740; one or more float switch binary interfaces 750; one or more serial port interfaces 760; one or more auxiliary camera interfaces 770; and one or more external device control interfaces 780. The external power interface(s) 710 could include one or more connectors that connect the camera module 130 to a suitable power source, including a DC power source derived from AC line power, an external battery, a solar panel, etc. The current interface(s) 720 could include one or more 4-20 mA current interfaces that allow connecting to sensors that communicate on a 4-20 mA current interface, such as the MASSA Pulstar sensor and the Vega Radar sensor. The voltage interfaces 730 could include one or more 0-10 volt DC interfaces for connecting to a sensor that outputs a voltage signal in the range of 0 to 10 volts DC. The pulse counter digital interfaces 740 could include one or more digital interfaces that count digital pulses, such as those provided by electronic rain gauges. The float switch binary switch interface(s) 750 could include one or more digital interfaces that detect two different binary states of a float switch that indicate a level of wastewater in a pipe, such as an inactive state indicating the level of wastewater is below a threshold and an active state indicating the level of water is above the threshold. The serial port interface(s) 760 could include digital interfaces that support any suitable serial port protocol, including without limitation Universal Serial Bus (USB), RS-232, RS-485, universal asynchronous receiver/transmitter (UART), etc. The serial port interface(s) 760 thus allow directly connecting to the camera module 130 any sensor that communicates via serial communications, including a ISCO 2150 flow meter and an ADS Triton flow meter.

The auxiliary camera interface(s) 770 could include any suitable interface to a second camera, such as a USB interface. Dual camera applications are discussed in more detail below with respect to FIG. 30. The external device control interfaces 780 could include interfaces that allow the camera module 130 to directly control one or more external devices. For example, a digital output to a relay could be used to activate the relay to perform a remedial function, such as opening a gate or starting a pump. In addition, one of the current interfaces 720 could be used to control a gate using multiple positions proportional to different current levels, or could be used to run a variable-speed pump with a speed proportional to different current levels. The external device control interfaces 780 could also include an output to a Supervisory Control and Data Acquisition (SCADA) panel. Many municipalities use SCADA systems to monitor and control their wastewater systems. The external device control interfaces 780 could include an output to a relay or a serial communication to a SCADA system, thereby providing an alarm indication on the SCADA panel.

The external device control interface(s) 780 preferably each have a different connector to the outside case of the camera module 130. In the most preferred embodiments, the connectors are waterproof and made of plastic and/or stainless steel so they will not corrode in a wet environment on in an environment, such as a sewer system, that has high concentrations of hydrogen sulfide ($H_2S$) gas.

Some examples of suitable camera settings 674 in FIG. 6 are shown in FIG. 8 to include photo interval 810; photo tag settings 815; image rotation settings 820; photo analysis settings 825; event notification settings 830; time setting 835; image settings 840; camera mode setting 845; remote software update settings 850; weather forecast settings 855; sound activation settings 860; contaminant detection settings 865; and auxiliary camera settings 870. The photo interval 810 defines a baseline interval for taking photos. The baseline for taking photos is an interval or frequency of taking photos when no external sensors or devices indicate a need to increase the frequency of taking photos. The photo tag settings 815 indicate whether the time/date, location, temperature or battery level will be added as visible information on the visible image portion of a photo. These settings are preferably enable/disable settings for the time/date tag tool 650, the location tag tool 652, the temperature tag tool 654, and the battery level tag tool 656. Image rotation settings 820 indicate whether images in the photos need to be rotated. Photo analysis settings 825 define when photos are analyzed by the AI photo analysis mechanism. Event notification settings 830 define events that can be detected, and what actions to be taken in response to each detected event. Time setting 835 is set to the current date/time so the photos can be tagged with the current date and time in the metadata for the photo, and can also be tagged in the visible portion of the photo by the time/date tag tool 650. Image settings 840 can include any suitable settings relating to the images being captured by the camera module 130, including by way of example resolution, brightness, compression, sharpness, contrast, exposure, etc.

Figure 5:
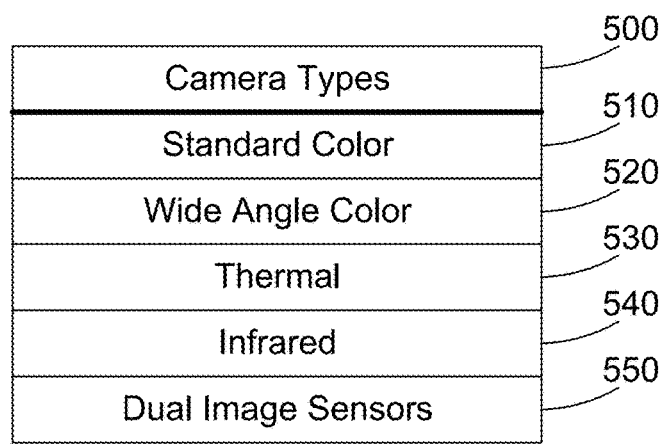
FIG. 5 is a table showing examples of suitable camera types for the camera face module.

Camera mode setting 845 specifies whether the camera mode is color, thermal, infrared, stereovision, etc. The camera mode settings 845 are set to match the camera type of the camera face module 150, examples of which are shown in FIG. 5. Remote software update settings 850 can specify any suitable setting or parameter relating to software updates for the camera, including which persons or entities can perform an update, when such an update can occur, whether the update is pushed to the camera or requested by the camera, etc.

Weather forecast settings 855 can specify an alteration of the operating mode of the camera based on weather forecasts that may be accessed by the camera. These weather forecasts could be, for example, a weather forecast from an online weather website such as www.weather.com. In another example, the weather forecast could be accessed by an individual from any suitable source, including television, online, etc., and the individual could then fill out an electronic "weather alert form" that is sent to the camera so the camera is aware of upcoming weather events. A simple example will illustrate. Let's assume an online weather forecast indicates a high percentage chance of heavy rain tomorrow from 3:00-5:00 PM. In response, the camera could adjust its settings tomorrow to increase the frequency of taking photos (by reducing the photo interval 810) at 2:30 PM, further increase the frequency of taking photos once the time reaches 3:00 PM, then keep the elevated frequency of taking photos until 5:30 PM. Specifying weather forecast settings 845 allows the camera to intelligently change its function according to expected weather events. The ability to alter the function of the camera according to expected weather events is a significant advantage not known in the prior art.

Sound activation settings 860 specify one or more actions the camera can take as a result of detecting sounds. Sound activation settings 850 could, for example, specify to increase the frequency of taking photos when the sound level detected by microphone 692 exceeds some specified threshold that is set at a level so rushing water near the camera can be detected by the noise the rushing water produces at the microphone 692. Contaminant detection settings 865 can include any suitable settings related to detection of contaminants in the wastewater flow. Contaminants can include, for example, grease, oil, paint, chemicals, rocks and gravel, leaves, twigs and branches, etc. The contaminant detection settings 865 could specify, for example, to send an alarm message to a person when a contaminant is detected so the person can initiate remedial action according to the detected contaminant. Contaminant detection settings 865 could also detect contaminants based on a difference in temperature. Thus, sewage flow could have a normal temperature, while inflow from storms could be at a much different temperature, allowing the detection of the stormwater based on the temperature differential.

Auxiliary camera settings 870 include any suitable settings for an auxiliary camera coupled to this camera, including all the settings shown in FIG. 8. In one specific embodiment, the auxiliary camera is also a camera 100 as shown in FIGS. 1 and 2, and the auxiliary camera settings 870 could be settings that are received by a first camera then sent to the auxiliary camera. Of course, the auxiliary camera could also receive its settings directly, instead of through the main camera. In a different embodiment, the auxiliary camera could be a different type of camera, and the auxiliary camera settings 870 in this case would be customized to that different type of camera. For example, an auxiliary camera could be programmed to function as a slave to the main camera, where the auxiliary camera only takes photographs when instructed by the main camera. These and other variations are within the scope of the disclosure and claims herein.

Figure 9:
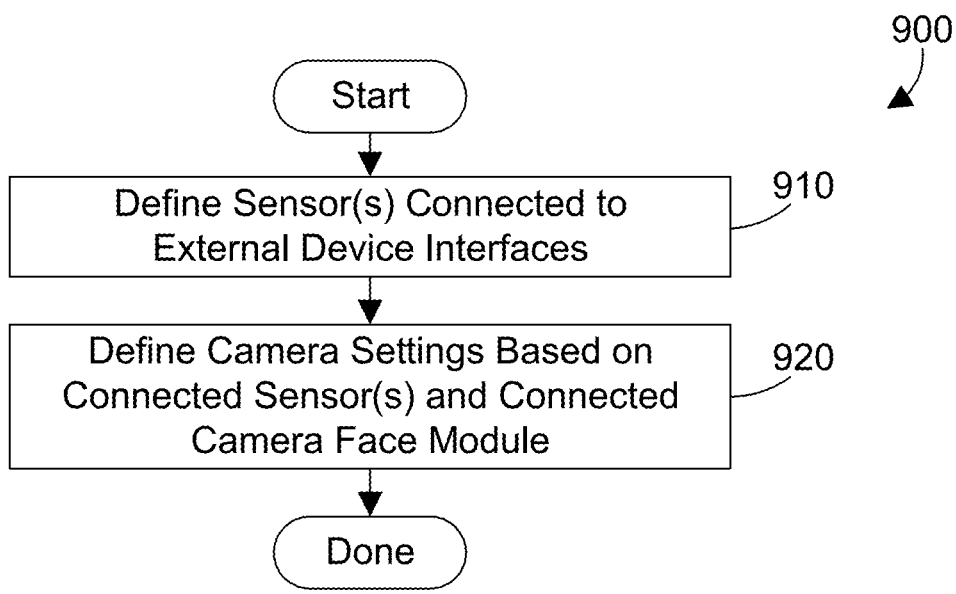
FIG. 9 is flow diagram of a method for setting up a camera for use.

A camera 100 must be configured before it can be used in a particular installation. Referring to FIG. 9, a method 900 allows defining which sensors are connected to which external device interfaces (step 910). The camera settings are then defined based on the connected sensors and the connected camera face module (step 920). Method 900 is then done. The camera face module defines the type of camera, such as one of the camera types shown in FIG. 5, and the camera module then needs to be configured with settings that correspond to the type of camera as determined by the camera face module.

Figure 10:
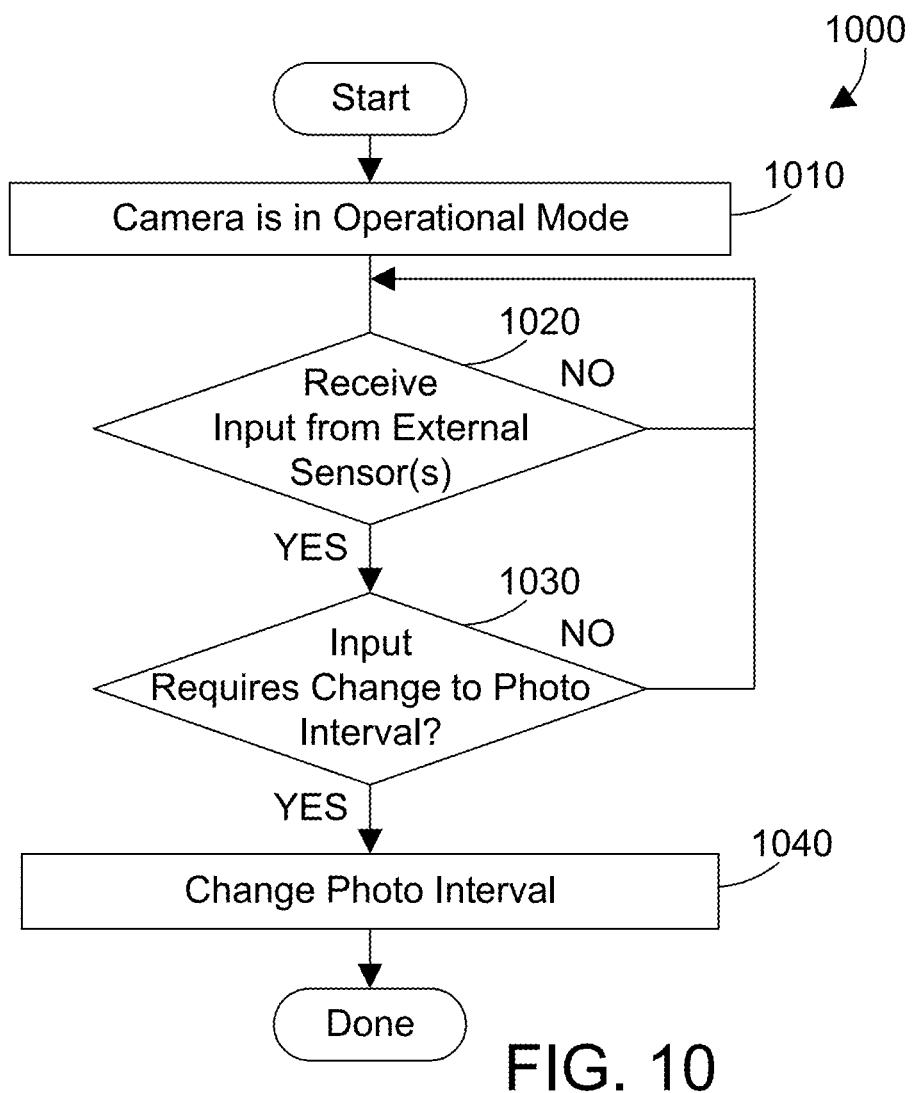
FIG. 10 is a flow diagram of a method for changing the photo interval for the camera according to input the camera module receives from one or more external sensors.

FIG. 10 shows a method 1000 for the camera to operate after it has been configured using method 900 in FIG. 9. The camera is in its operational mode (step 1010). When no input is received from external sensors (step 1020=NO), method 1000 loops back until input is received from one or more external sensors (step 1020=YES). When the input received from the one or more external sensors does not require a change to the photo interval (step 1030=NO), method 1000 loops back to step 1020 and continues. When the input does require a change to the photo interval (step 1030=YES), the photo interval is changed (step 1040) according to the camera settings that define the operational mode of the camera. Method 1000 is then done. Receiving input from external sensor(s) in step 1020 can occur in two different ways. A first way is for the sensor to periodically send its data to the camera. A second way is for the camera to request a sensor reading, at which time the sensor sends its data to the camera. Receiving input from the external sensors 1020 can occur either way within the scope of the disclosure and claims herein.

Figure 11:
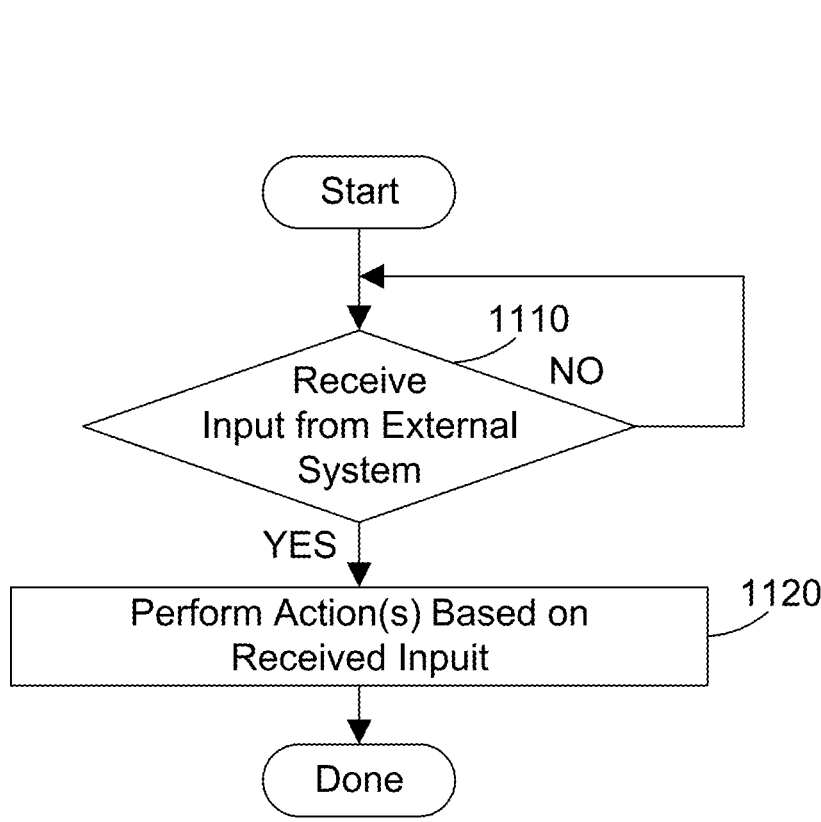
FIG. 11 is a flow diagram of a method for the camera to perform functions according to input received from one or more devices external to the camera.

The camera 100 can also perform actions in response to input received from an external system. Examples of external systems include without limitation a cell phone within Bluetooth range of the camera; a tablet computer connected via cable dongle to the camera; a remote computer system that provides input to the camera via email, text, or other message via a wireless network, such as Wi-Fi or a cellular telephone network; or any device with serial communication such as RS-232, RS-485, or UART. Referring to FIG. 11, method 1100 begins by determining whether input is received from an external system (step 1110). If not (step 1110=NO), method 1100 loops back and waits until input is received from an external system (step 1110=YES). The camera can then perform one or more actions based on the received input (step 1120). Method 1100 is then done.

Figure 12:
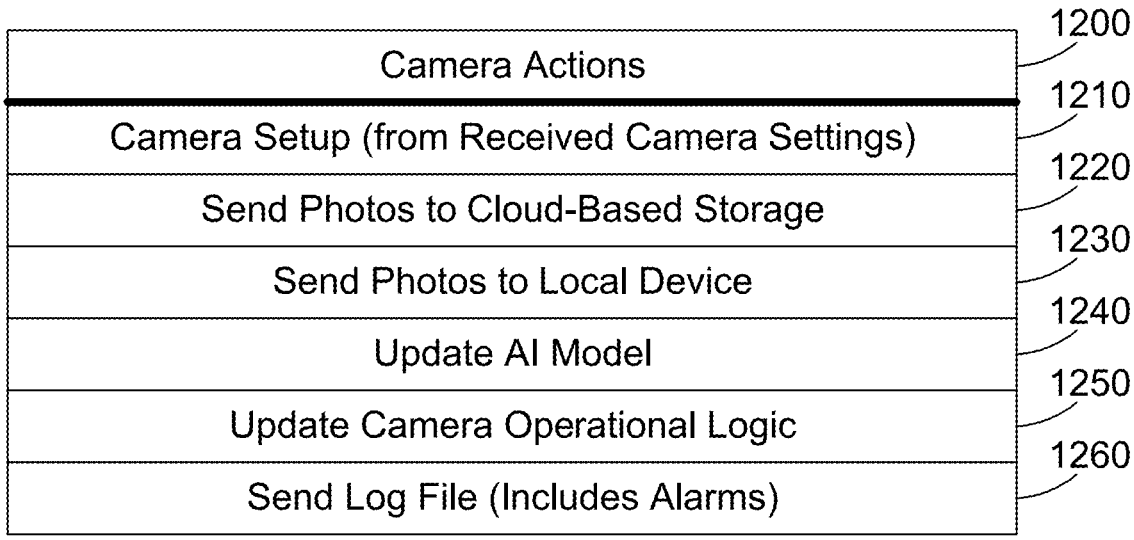
FIG. 12 is a table showing possible camera actions that could be performed in step 1120 in FIG. 11.

Some examples of suitable camera actions that the camera could perform in step 1120 in FIG. 11 in response to received input from an external system are shown in the table 1200 in FIG. 12. Camera setup 1210 may include received camera settings that are used by the camera to set its own settings. Send photos to cloud-based storage 1220 is an action that causes the camera to send its photos to cloud-based storage. Send photos to local device 1230 is an action that causes the camera to send its photos to a local device, such as a cell phone or tablet computer connected to the camera via wireless or cable connection. Update AI model 1240 is an action that causes the camera to update its AI model with a new AI model received from the external system. The update camera operational logic 1250 is an action that causes the operational logic of the camera to be updated according to settings or parameters received from an external system. The updating of the camera operational logic could include the update of an operating system in the camera module. Send log file 1260 is an action that causes the camera to send to the external system a log file of activity of the camera. The log file can include any alarms the camera detected.

Figure 13:
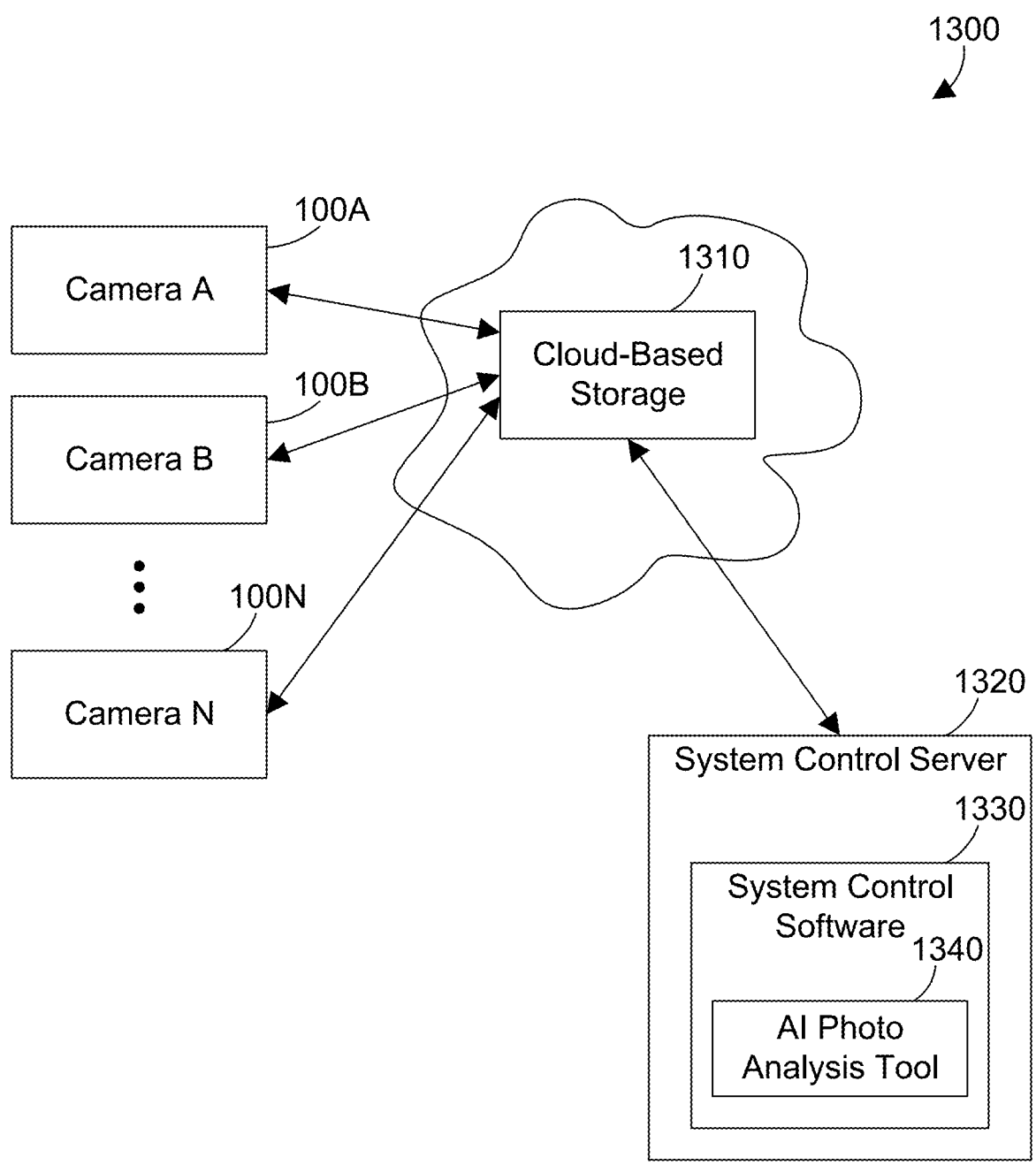
FIG. 13 is a block diagram showing multiple cameras connected to a cloud-based storage, which is connected to a system control server.

FIG. 13 shows a sample system 1300 that includes multiple cameras 100A, 100B, . . . , 100N communicating with a cloud-based storage 1310, and also communicating with a system control server 1320. Each camera 100A, 100B, . . . , 100N is preferably a camera 100 as disclosed herein. The system control server 1320 can be a typical desktop or laptop computer system that runs system control software 1330. The system control software 1330 includes an AI photo analysis tool 1340. The AI photo analysis tool 1340 in the system control server 1320 could use the same AI model 672 used on the camera. In the alternative, the AI photo analysis tool 1340 could use a different AI model. One suitable implementation of the system control software 1330 keeps track of many different cameras and their related photos. The AI photo analysis tool 1340 allows analyzing a stream of photos to detect alarm conditions based on one or more assigned categories for the photos.

While analyzing photos in cloud-based storage 1310 from one or more cameras by the AI photo analysis tool 1340 is incredibly useful, it is even more useful for the camera itself to analyze photos it takes in near real-time because the camera can then detect alarm conditions based on an assigned category for a photo and take action without waiting for the system control server 1320 to detect the problem. For this reason, the camera 100 disclosed herein includes an AI photo analysis tool 670 that analyzes photos the camera takes in near real-time using one or more AI models 672.

Figure 14:
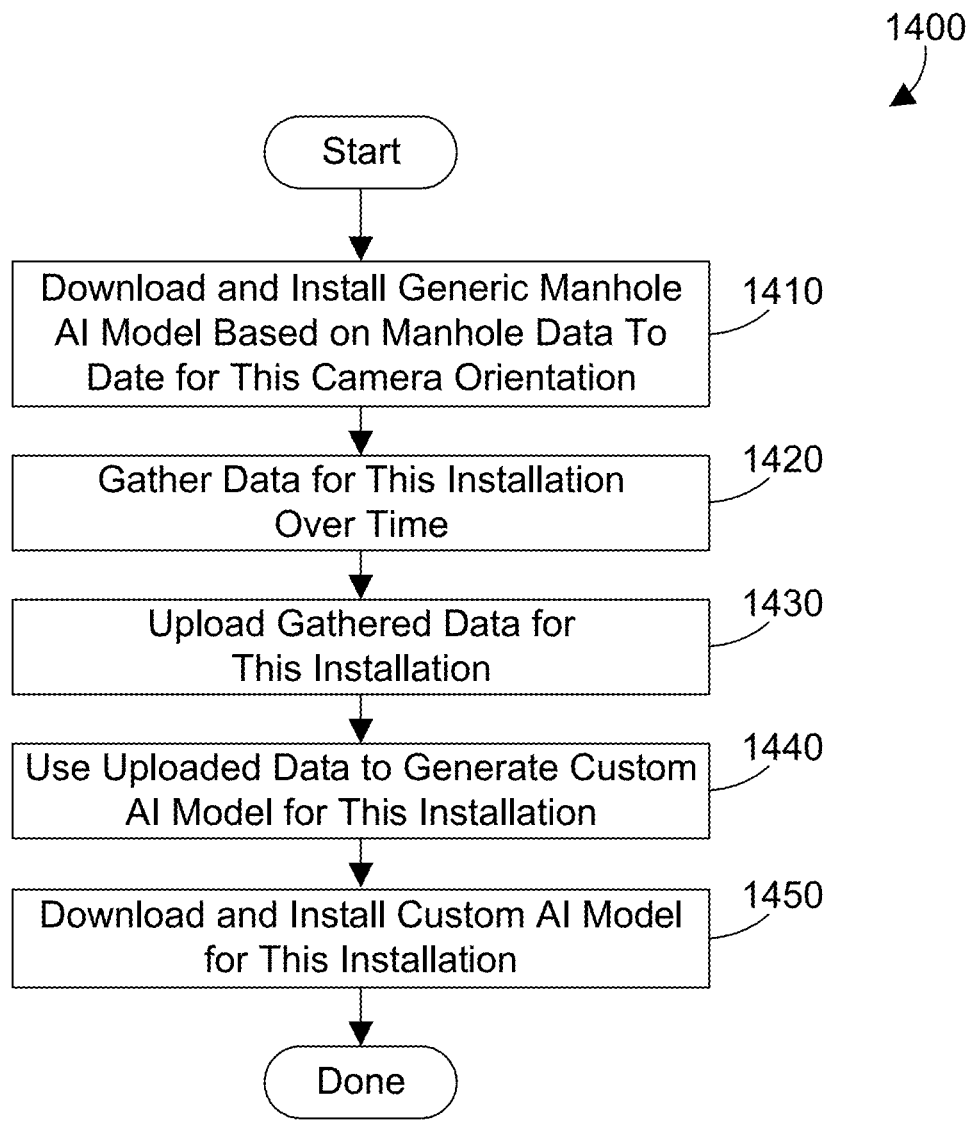
FIG. 14 is a flow diagram of a method for generating a custom AI model for a particular camera installation.

FIG. 14 shows a method 1400 for the camera to receive and update its AI model 672 shown in FIG. 6. A generic manhole AI model is downloaded and installed to the camera based on manhole data to date for this specific camera orientation (step 1410). In the most preferred implementation, there are multiple AI models that each correspond to a camera orientation, and the AI model that is downloaded and installed to the camera is the AI model that corresponds to the camera orientation. For example, there could be a first AI model that corresponds to the camera pointing straight down a manhole. There could be a second AI model that corresponds to the camera at the bottom of a manhole pointing up. There could be a third AI model that corresponds to the camera pointing sideways in a pipe. There could be a fourth AI model that corresponds to the camera pointing to the opening of a pipe. These three simple examples are not limiting, and illustrate that many different AI models could exist for many different corresponding camera orientations.

Referring again to FIG. 14, data for this installation is gathered over time (step 1420). The gathered data for this installation is then uploaded (step 1430). The gathered data could be uploaded to a cell phone or a tablet computer that are in physical proximity to the camera, or could be uploaded to the system control software 1330 in the system control server 1320 shown in FIG. 13 via Wi-Fi or cellular phone network. The uploaded data is then used to generate a custom AI model for this installation (step 1440). This custom AI model for this installation is then downloaded and installed to the camera (step 1450). Method 1400 is then done.

Figure 15:
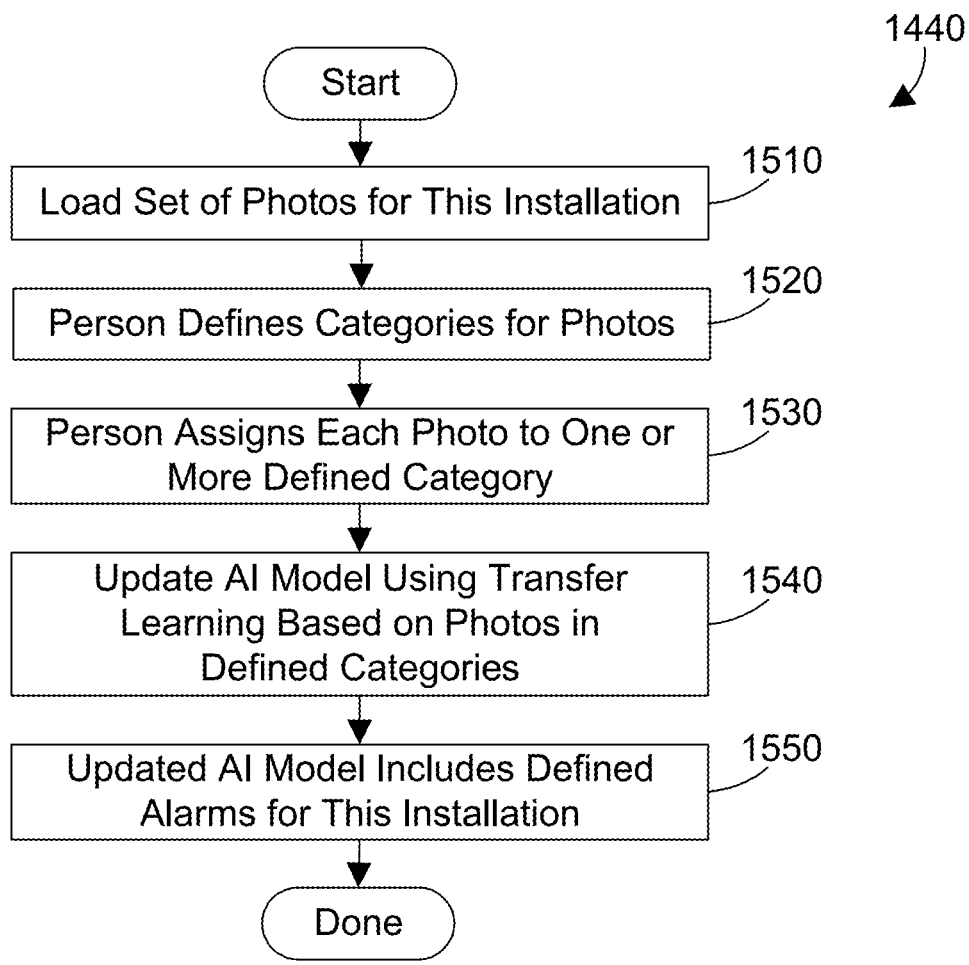
FIG. 15 is a flow diagram of one suitable implementation for step 1440 in FIG. 14.

The refinement of the AI model can include steps taken by a human person. Referring to FIG. 15, one suitable implementation for step 1440 in FIG. 14 is method 1440 in FIG. 15, which loads a set of photos for this installation (step 1510), having a human person define categories for the photos (step 1520), having the person assign each photo to one or more defined category (step 1530), updating the AI model using transfer learning based on the photos in the defined categories (step 1540), where the updated AI model includes defined alarms for this installation (step 1550). Method 1440 is then done. In the alternative, instead of a human person taking action to update the AI model, the AI model could be automatically updated using machine learning or deep learning. The camera itself could thus include a machine learning tool that automatically analyzes photos and automatically updates the AI model as needed using a suitable machine learning or deep learning algorithm.

Figure 16:
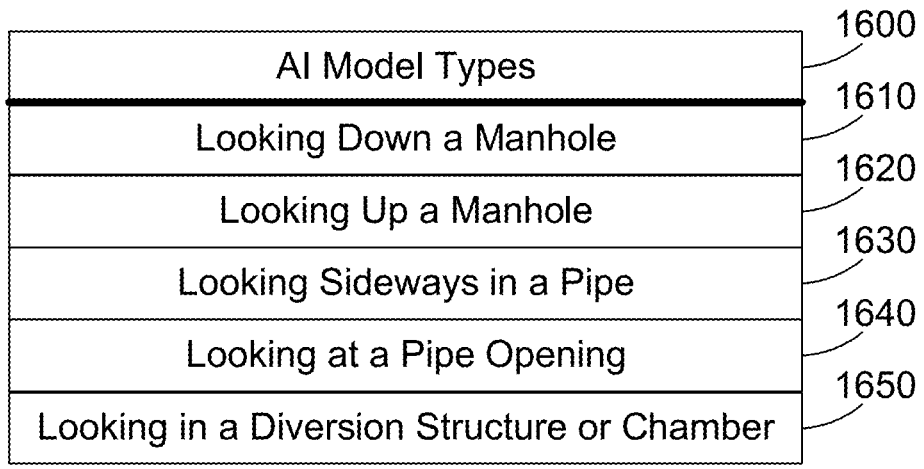
FIG. 16 is a table showing possible AI model types for wastewater monitoring.

Referring to FIG. 16, a table 1600 shows some examples of different AI model types. The AI model types shown in FIG. 16 include: looking down a manhole 1610; looking up a manhole 1620; looking sideways in a pipe 1630; looking at a pipe opening 1640; and looking in a diversion structure or chamber 1640.

FIG. 17 shows a table 1700 that includes sample photo categories. The sample photo categories shown in FIG. 17 include: low flow 1710; intermediate flow 1720; high flow 1730; inflow detected 1740; contamination detected 1750; objects detected 1760; color change detected 1770; overflow 1780; and blockage 1790. Low flow 1710 is the category for photos that show a flow level that is defined to be low level. Intermediate flow 1720 is the category for photos that show a flow level that is defined to be intermediate. High flow 1730 is the category for photos that show a flow level that is defined to be high. While the specific example in FIG. 17 shows only three flow levels of low, intermediate and high, any suitable number of flow levels could be defined. Inflow detected 1740 is the category for photos that show inflow into the wastewater. Contamination detected 1750 is the category for photos that show contamination in the wastewater, such as grease, paint, oils or chemicals. Objects detected 1760 is the category for photos that show objects in the wastewater, such as rocks, gravel, leaves, tree branches, etc. Color change detected 1770 is the category for photos that show a color change in the wastewater, which is indicative of contamination. Overflow 1780 is the category for photos that show an overflow condition, such as a manhole overflowing or a diversion structure overflowing. Blockage 1790 is the category for photos that show a blockage in a manhole or pipe.

A photo can be categorized using one photo category, or can be categorized using multiple photo categories. Examples of suitable photo categories are shown in FIG. 17 and discussed above. In addition, the categories can have percentages assigned by the AI photo analysis tool 670 that reflects a percentage confidence level for the assigned category. A simple example will illustrate. Let's assume a photo is analyzed by the AI photo analysis tool 670, which determines the photo corresponds to intermediate flow 1720 with 90% confidence and further determines the photo shows a blockage 1790 with 55% confidence. The photo can be categorized according to the defined categories, confidence, and defined thresholds. If a threshold of 50% is set for a photo to be categorized, in the simple example above the photo would be categorized as intermediate flow 1720 and blockage 1790. In this same example, if the threshold were set to 60%, the photo would be categorized as intermediate flow 1720 but not as blockage 1790, because the blockage confidence of 55% does not exceed the threshold of 60%.

One of the significant advantages of having the camera itself perform analysis of the photos in near real-time is the camera can detect alarm conditions based on an assigned category for a photo and immediately act accordingly. Sample alarms are shown in table 1800 in FIG. 18. Sample alarms include: intermediate flow detected 1810; high flow detected 1820; inflow detected 1830; contamination detected 1840; one or more objects detected 1850; overflow detected 1860; and blockage detected 1870. The alarms 1810 through 1870 are alarms that correspond to the photo categories 1720-1790 discussed above in FIG. 17.

Sample alarm actions are shown in table 1900 in FIG. 19 to include: change photo interval 1910; change data sampling interval 1920; send message corresponding to alarm 1930; send photos real-time 1940; activate pump 1950; and activate gate 1960. Changing photo interval 1910 causes the camera to increase or decrease the frequency of taking photos. Changing data sampling interval 1920 causes the camera to increase or decrease the frequency of data sampling by one or more sensors connected to the camera, such as an ultrasonic depth sensor. The data sampling can occur by a sensor sending its data to the camera periodically based on the data sampling interval, or can occur by the camera polling a sensor periodically based on the data sampling interval and asking for its data. Sending a message corresponding to the alarm 1930 can include any suitable notification to any person or system, including a text message to a person, an email to a person, an email to a computer system, a message on a serial interface to an external device, activating a warning light on a SCADA panel, etc. Sending photos real-time 1940 can cause the photos to be sent by the camera as soon as they are taken to a cloud-based storage or to an external computer system for review and analysis, such as system control server 1320 in FIG. 13. Activate pump 1950 is an action that activates a pump to provide remedial action in response to a condition detected in one or more of the photos. Activate pump 1950 can be done via a relay that simply turns the pump on, or could be done via a more sophisticated interface that allows controlling the speed of the pump when the pump is a variable-speed pump. Activate gate 1960 is an action that activates a gate to direct water flow to provide remedial action in response to a condition detected in one or more of the photos. Activate gate 1960 can be done via a relay that simply moves the gate open or closed, or could be done via a more sophisticated interface that allows controlling the position of the gate when the gate has multiple distinct positions.

Figure 20:
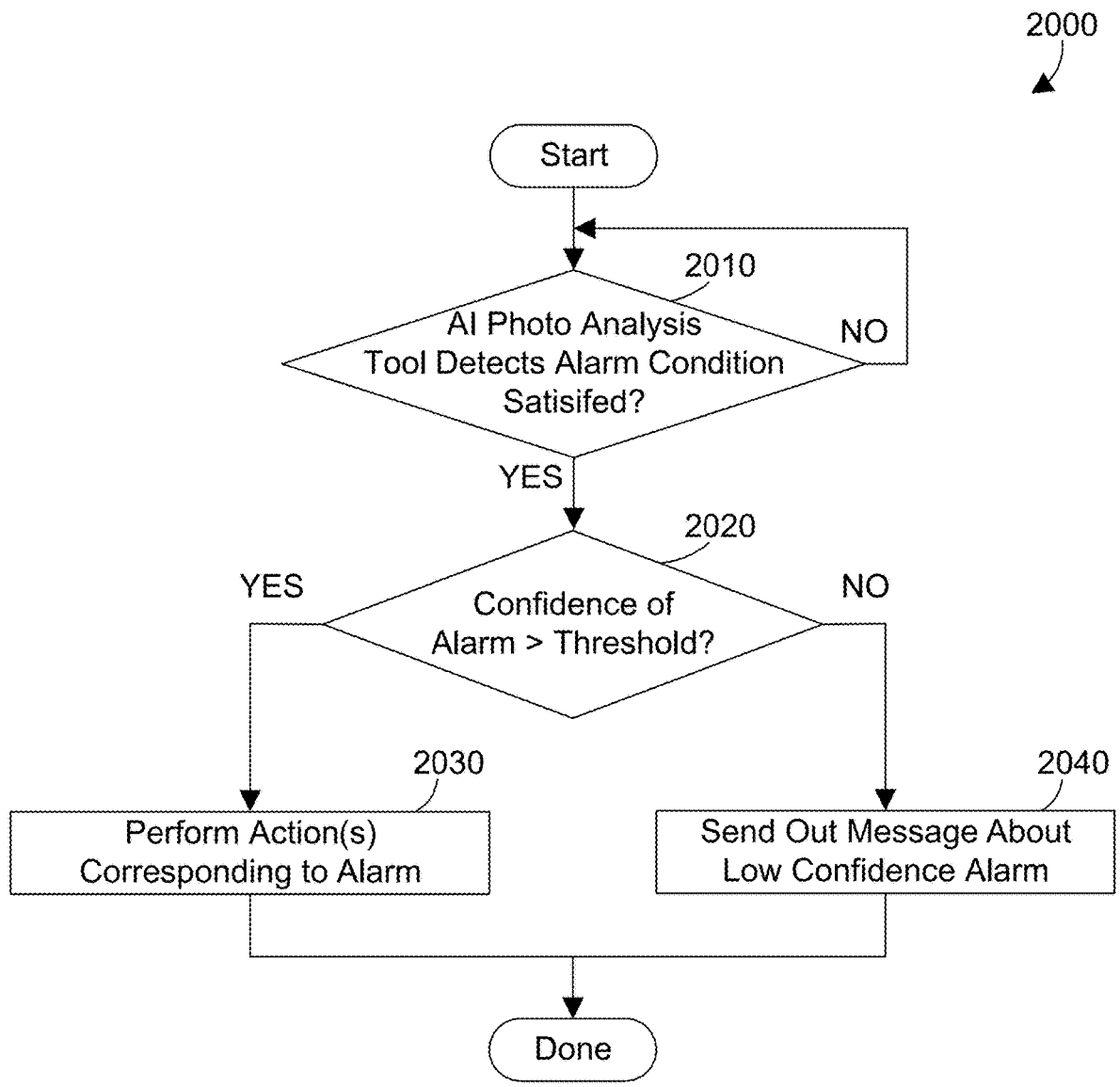
FIG. 20 is a flow diagram of a method for the AI photo analysis tool to act on an alarm when the AI photo analysis tool detects an alarm.

One aspect of AI analysis is the confidence of the AI analysis is often expressed as a percentage. When the AI photo analysis tool 670 detects using the AI model 672 an alarm condition with a high confidence, the alarm can be acted on directly. But when the confidence is low, the alarm may not be acted upon. Referring to FIG. 20, method 2000 shows when the AI photo analysis tool does not detect an alarm condition is satisfied (step 2010=NO), method 2000 loops back until the AI photo analysis tool detects an alarm condition is satisfied (step 2010=YES). When the confidence of the alarm is greater than some predefined threshold (step 220=YES), method 2000 performs one or more actions corresponding to the detected alarm (step 2030). When the confidence of the alarm is not greater than the predefined threshold (step 2020=NO), a message is sent out about the low confidence alarm (step 2040). Such a message can allow a user to inspect the low confidence alarm and the corresponding photo(s), which the user could then use to further refine the AI model. Method 2000 is then done.

Figure 21:
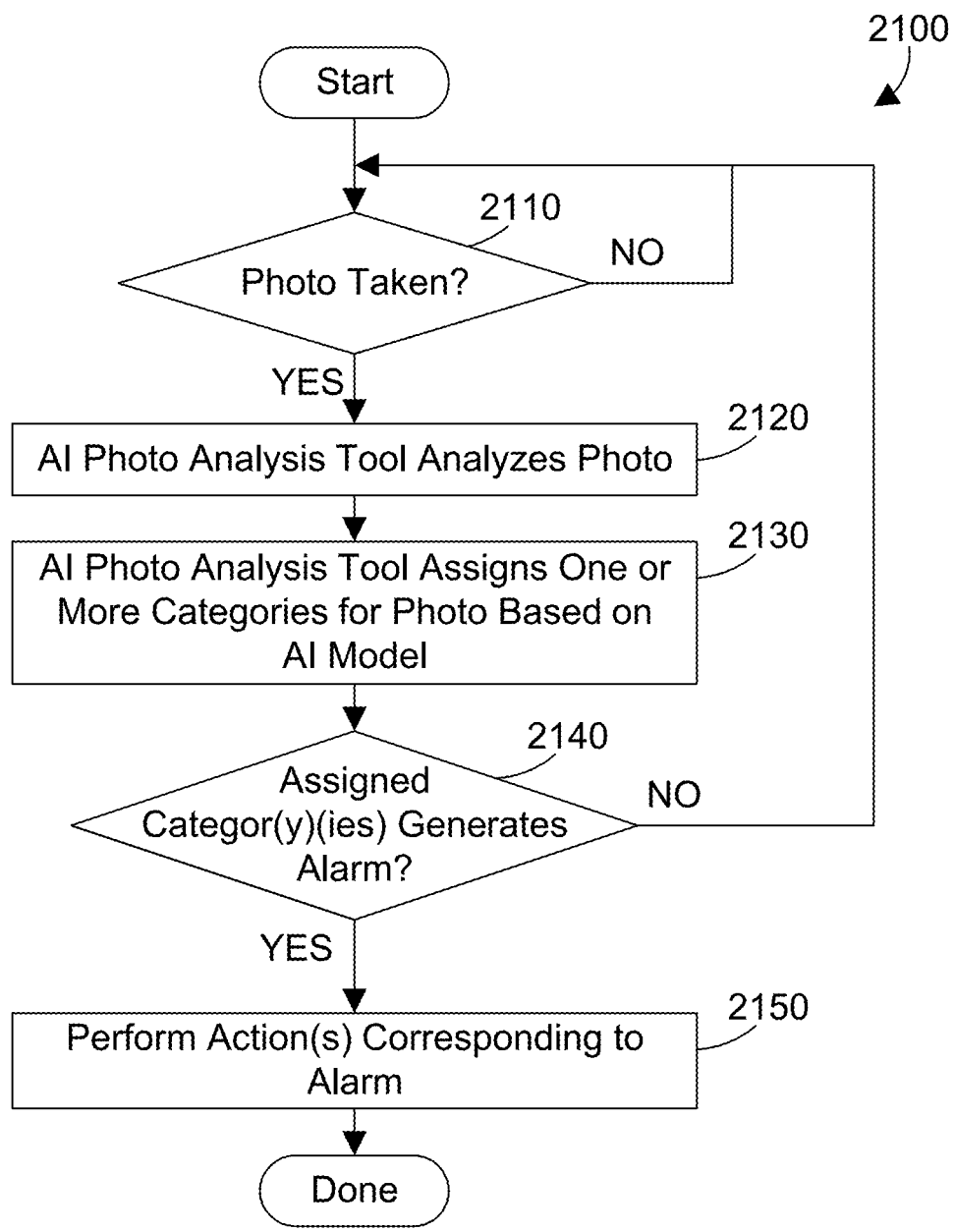
FIG. 21 is a flow diagram of a method for the camera to automatically analyze a photo to assign the photo to one or more categories, and to perform one or more actions corresponding to an alarm that corresponds to the one or more categories.

The near real-time analysis of photos by the camera allows the camera itself to categorize the photos and to take action based on any corresponding alarms. Referring to FIG. 21, method 2100 waits as long as no photo is taken (step 2110=NO). Once a photo is taken (step 2110=YES), the AI photo analysis tool analyzes the photo (step 2120) and assigns one or more categories for the photo based on the AI model (step 2130). When the assigned category or categories do not generate any alarm (step 2140=NO), method 2100 loops back to step 2110 and continues. When the assigned category or categories generate one or more alarms (step 2140=YES), the action or actions corresponding to the alarm are performed (step 2150). Method 2100 is then done.

Figure 22:
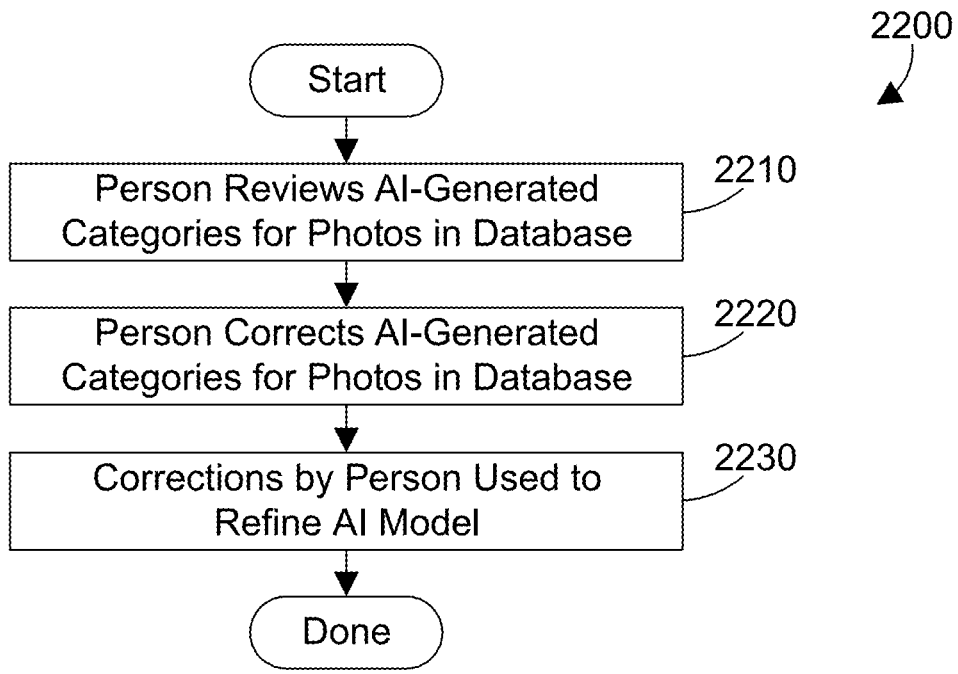
FIG. 22 is a flow diagram of a method for a human to make corrections to an AI model.

The AI model can be refined by having a human person correct errors in the camera's automatic categorization of photos. Referring to FIG. 22, a method 2200 begins by a person reviewing the AI-generated categories for photos in a photo database (step 2210). The person corrects the AI-generated categories for one or more photos in the database (step 2220). The person's corrections are then used to refine the AI model (step 2230). Method 2200 is then done.

Figure 23:
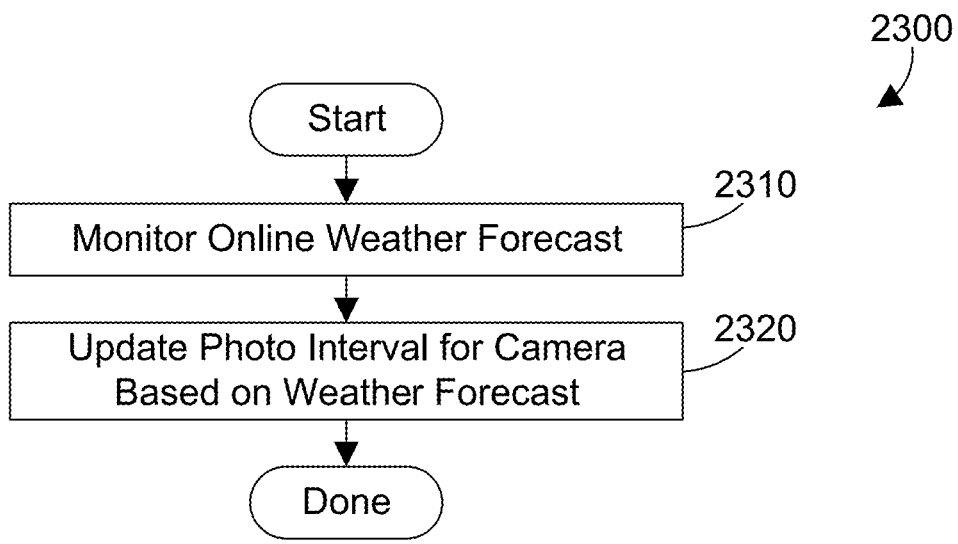
FIG. 23 is a flow diagram of a method for updating a photo interval for the camera based on an online weather forecast.

Referring to FIG. 23, a method 2300 allows the camera to change it functions according to a weather forecast. The camera monitors an online weather forecast (step 2310). The photo interval for the camera is then updated based on the weather forecast (step 2320). Method 2300 is then done. While method 2300 refers to an online weather forecast, the weather forecast could be provided to the camera in any suitable way, such as downloading a weather forecast alert form to the camera module, etc.

Figure 24:
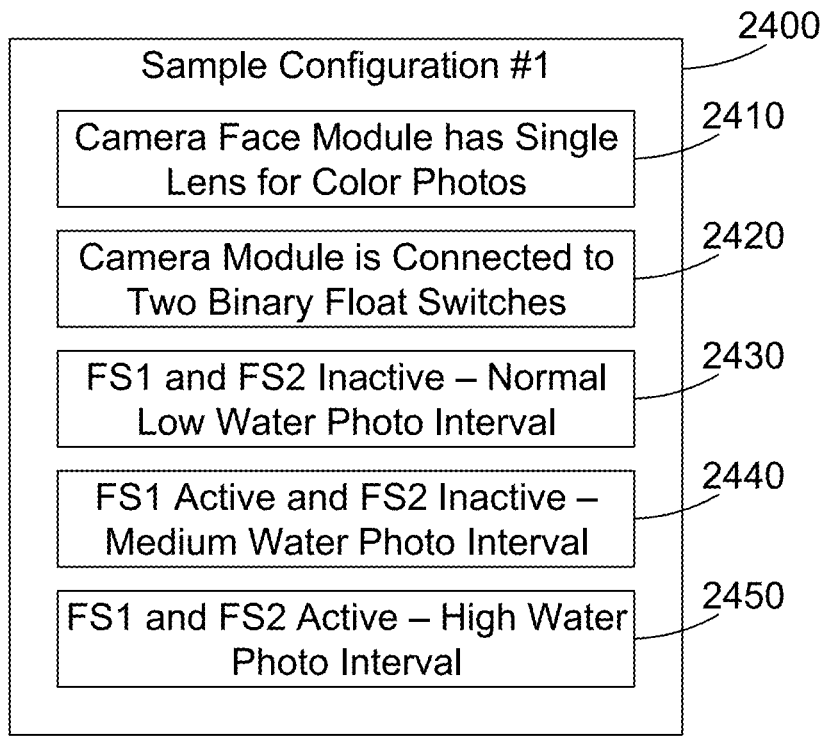
FIG. 24 is a block diagram showing a first sample configuration for the modular camera.

Several sample configurations are now presented to show the power and versatility of the camera disclosed and claimed herein. In a first sample configuration 2400 shown in FIG. 24, the camera face module has a single lens and an image sensor array for color photos 2410 and the camera module is connected to two binary float switches 2420. In this first sample configuration, the first float switch FS1 is installed at a level to indicate a medium water level when activated, and the second float switch FS2 is installed at a level to indicate a high water level when activated. When both float switches FS1 and FS2 are inactive, a low water photo interval 2430 is used by the camera. When the first float switch FS1 is active and the second float switch FS2 is inactive, a medium water photo interval 2440 is used by the camera. When both float switches FS1 and FS2 are active, a high water photo interval 2450 is used by the camera. In this sample configuration, a low water photo interval could be 1 hour, a medium water photo interval could be 1 minute, and a high water photo interval could be 10 seconds.

Figure 25:
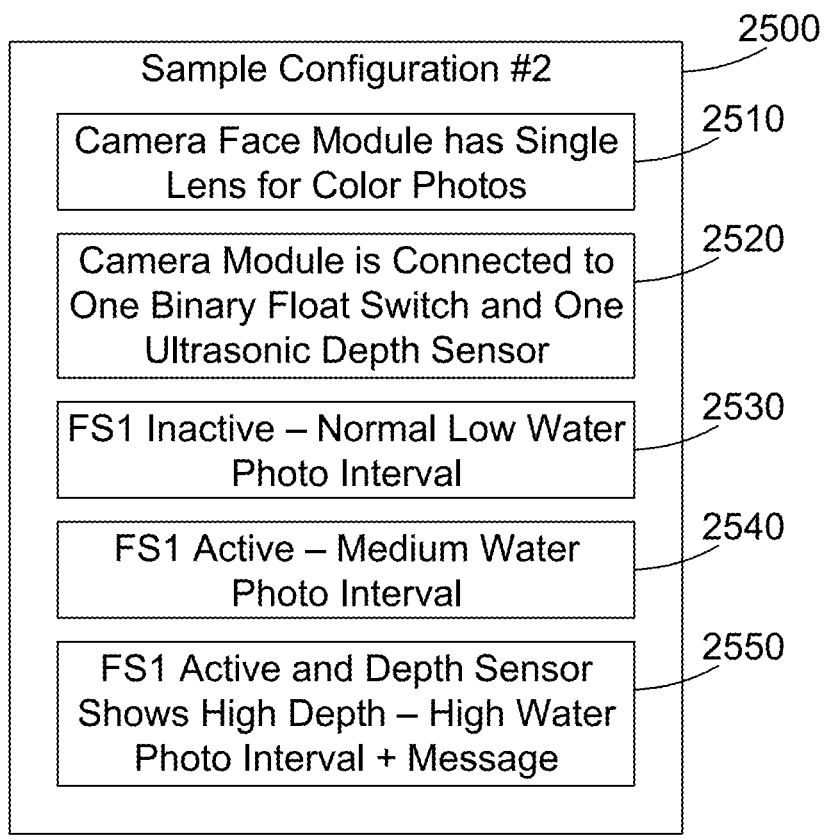
FIG. 25 is a block diagram showing a second sample configuration for the modular camera.

A second sample configuration is shown at 2500 in FIG. 25. The camera face module has a single lens and an image sensor array for color photos 2510. The camera module is connected to one binary float switch and one ultrasonic depth sensor 2520. When the float switch FS1 is inactive, a normal low water photo interval 2530 is used. When the float switch FS1 is active, a medium water photo interval 2540 is used. When the float switch FS1 is active and the depth sensor shows high depth, a high water photo interval is used and a message is sent 2550.

Figure 26:
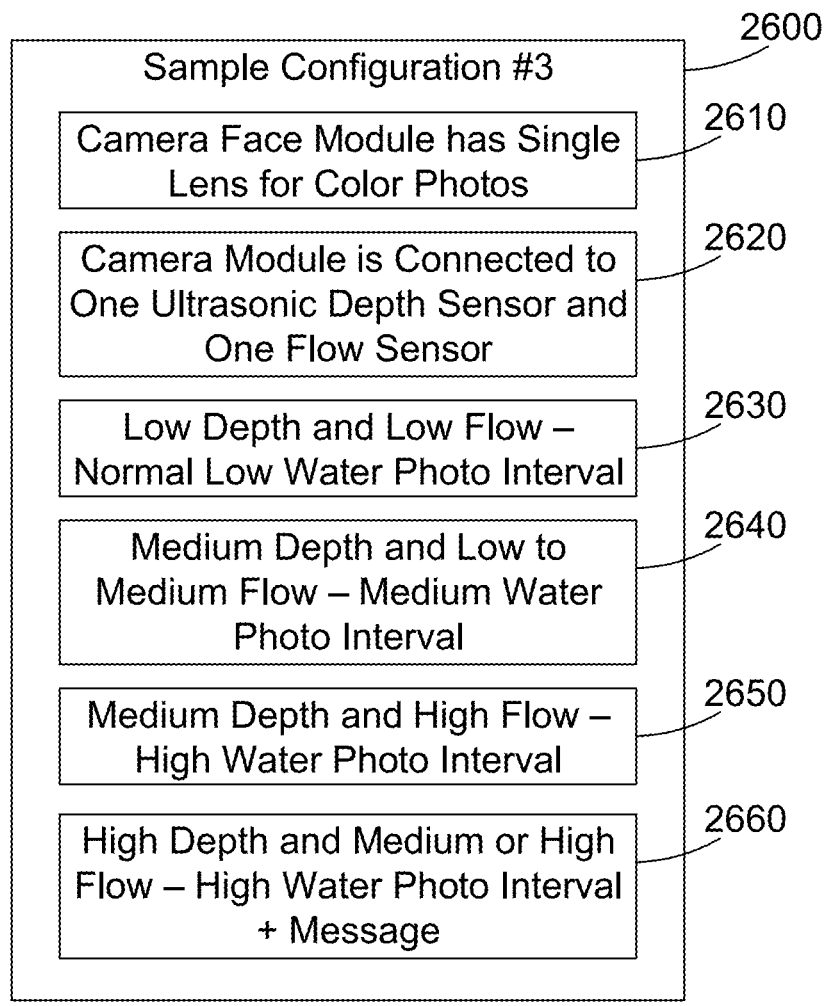
FIG. 26 is a block diagram showing a third sample configuration for the modular camera.

A third sample configuration is shown at 2600 in FIG. 26. The camera face module has a single lens and an image sensor array for color photos 2610. The camera module is connected to one ultrasonic depth sensor and one flow sensor 2620. One type of known flow sensor measures the velocity of the flow and the depth, and computes flow rate from velocity and depth. When the ultrasonic depth sensor indicates low depth and the flow sensor indicates low flow, the camera uses a normal low water photo interval 2630. When the ultrasonic depth sensor indicates medium depth and the flow sensor indicates low to medium flow, the camera uses a medium water photo interval 2640. When the ultrasonic depth sensor indicates medium depth and the flow sensor indicates high flow, the camera uses a high water photo interval 2650. When the ultrasonic depth sensor indicates high depth and the flow sensor indicates medium or high flow, the camera uses a high water photo interval and sends a message 2660.

Figure 27:
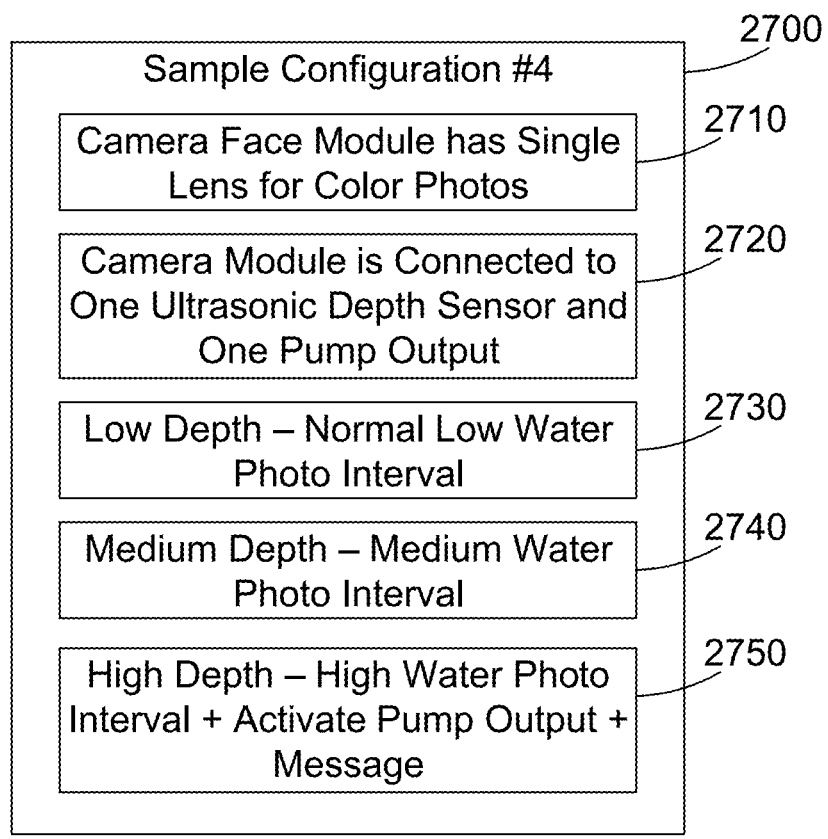
FIG. 27 is a block diagram showing a fourth sample configuration for the modular camera.

A fourth sample configuration is shown at 2700 in FIG. 27. The camera face module has a single lens and an image sensor array for color photos 2710. The camera module is connected to one ultrasonic depth sensor and to one pump output 2720. When the ultrasonic depth sensor indicates low depth, the camera uses a normal low water photo interval 2730. When the ultrasonic depth sensor indicates medium depth, the camera uses a medium water photo interval 2740. When the ultrasonic depth sensor indicates high depth, the camera uses a high water photo interval, activates the pump output, and sends a message 2750.

Figure 28:
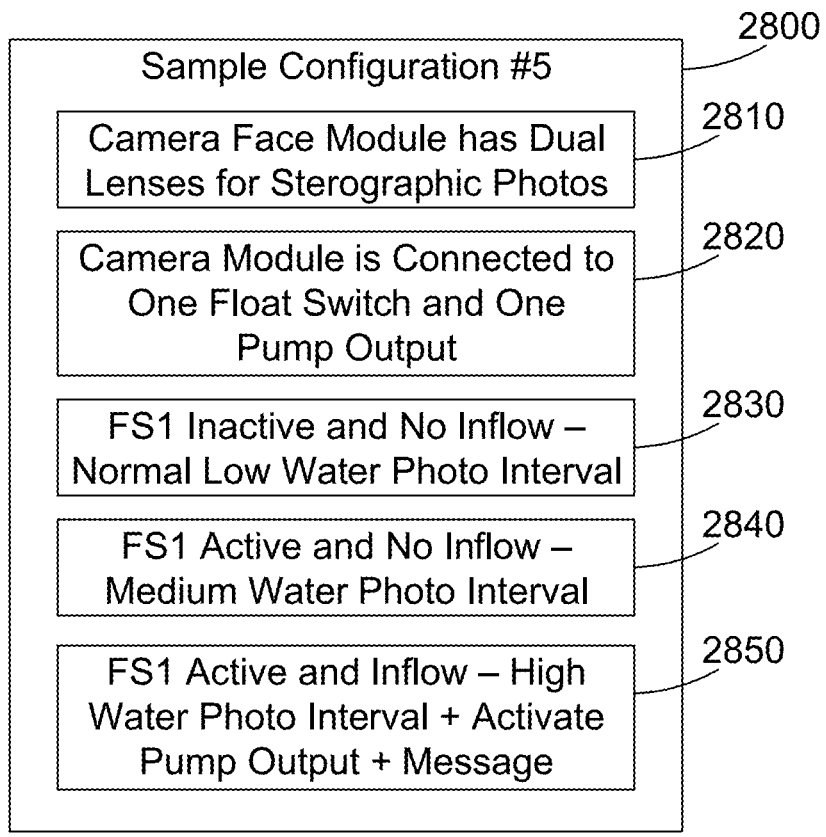
FIG. 28 is a block diagram showing a fifth sample configuration for the modular camera.

A fifth sample configuration is shown at 2800 in FIG. 28. The camera face module has dual lenses for stereographic photos that allow depth perception. We assume for this example the stereographic photos are useful in detecting inflow at a far side of a manhole. The camera module is connected to one float switch and one pump output 2820. When the float switch FS1 is inactive and the stereographic photos show no inflow, the camera uses a normal low water photo interval 2830. When the float switch FS1 is active and the stereographic photos show no inflow, the camera uses a medium water photo interval 2840. When the float switch FS1 is active and the stereographic photos show inflow, the camera uses a high water photo interval, the camera activates its pump output, and the camera sends a message 2850.

Figure 29:
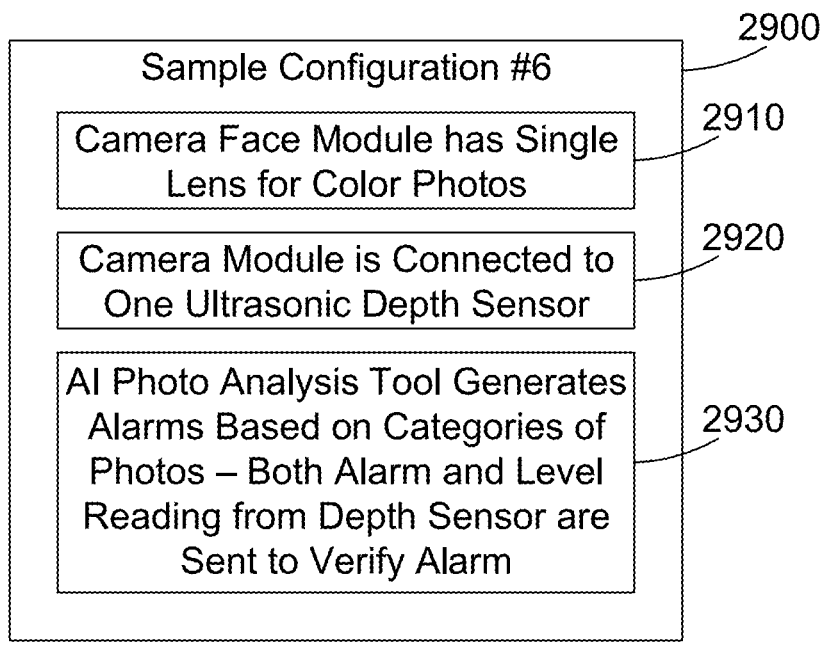
FIG. 29 is a block diagram showing a sixth sample configuration for the modular camera.

A sixth sample configuration is shown at 2900 in FIG. 29. The camera face module has a single lens and an image array for color photos 2910. The camera module is connected to one ultrasonic depth sensor 2920. The AI photo analysis tool generates alarms by the automatic categorization of photos 2930. When an alarm is generated, both the alarm is sent and the level reading from the ultrasonic depth sensor is sent. This allows verifying the alarm generated by the AI photo analysis tool using the reading from the ultrasonic depth sensor.

Other configurations are possible that use multiple sensors to detect an alarm condition. For example, a float switch and an ultrasonic depth sensor may both be used to generate an alarm condition, such that both have to indicate the alarm condition in order for the alarm to be recognized. This can prevent false alarms from dirty or malfunctioning sensors.

The six sample configurations in FIGS. 24-29 are shown by way of example, and are not limiting. A nearly limitless number of different configurations are possible based on the external device interfaces that allow nearly any suitable type of sensor to be connected to the camera. The disclosure and claims herein expressly extend to any and all suitable configurations that are possible in light of the specific examples disclosed and described herein and the disclosed features in the camera.

As discussed above with reference to FIG. 7, the camera preferably includes one or more auxiliary camera interfaces 770. There are several different applications for using dual cameras, some of which are shown by way of example in table 3000 in FIG. 30. Two cameras can monitor two different pipes in a manhole 3010. Two cameras can monitor two different angles in a manhole 3020. Two cameras with different focal lengths can monitor a manhole 3030. Two cameras can be used as a stereoscopic camera for depth perception and 3D representation in a manhole 3040. One color camera and one thermal camera can be used aimed at the same area so the thermal image can be overlaid over the color image to generate contour lines 3050. One color camera and one IR camera 3060 could be used. Many other applications besides those shown in FIG. 30 are within the scope of the disclosure and claims herein.

The camera disclosed herein can be used in many different monitoring applications. Examples of some of these applications are shown in table 3100 in FIG. 31. The monitoring application examples include: monitor storm sewers 3110; monitor sanitary sewers 3115; monitor combined sewers 3120; monitor Combined Sewer Overflows (CSO) 3125; monitor Sanitary Sewer Overflows (SSOs) 3130; monitor stormwater outlets and/or outfalls for illicit discharge upstream 3135; determine flow from a Thel-mar volumetric weir 3140; confirm pump station activity 3145; confirm outflows 3150; monitor drainage ditches 3155; monitor water at one or more retaining walls 3160; monitor bridges to create a timelapse of imagery to detect cracks, spalling and delamination underneath the outermost layer of asphalt 3165; and monitor electrical distribution systems for hot spots at peak load 3170. The monitoring of storm sewers 3110, monitoring of sanitary sewers 3115, and monitoring of combined sewers 3120 can be done as described above using the camera in a manhole. A CSO is a structure that handles both sanitary waste and storm water. During dry weather it transfers sanitary waste through the combined sewer system. But during intense wet weather it overflows, typically into a creek. The camera can monitor the CSO overflow and report when an overflow event happens. An SSO is a structure for a sanitary sewer that can overflow during heavy flows. The camera can monitor the SSO overflow and report when an overflow event happens.

The monitoring of stormwater outlets and/or outfalls for illicit discharge upstream 3135 can be done in a manhole, or in the alternative can be done in other locations, such as intakes and outfalls to creeks, storm ditches, or retention basins. A Thel-mar volumetric weir is a device with markings that indicate flow. The camera can take photos of the device, and using an AI model can determine flow based on the photo. Confirming pump station activity 3150 can be simply monitoring one or more levels of wastewater in the pump station. Monitoring training ditches 3155 and monitoring water at one or more retaining walls 3160 involves taking photos and determining from changes in the photos when water is present, and what level of water is present.

The monitoring of bridges 3165 is an interesting application for camera 100 that does not involve monitoring wastewater. Previous methods for monitoring the integrity of the pavement on bridges include ground-penetrating radar scans, or pulling chain-rakes across the surface of the pavement while listening for anomalies where pavement has voids below the surface. But the camera in a thermal mode can also detect cracks, spalling and delamination underneath the outermost layer of asphalt using timelapse photography because eventually the right combination of temperature contrast will occur over time to identify these defects.

Another interesting application for camera 100 that does not involve monitoring wastewater is monitoring electrical distribution systems for hot spots at peak load 3170. It is known in the art to inspect underground electrical distribution panels with infrared cameras using one or more still shots. However, the information in those still shots will show the thermal characteristics at the exact instant of time when each photo was taken. This is not very helpful in detecting problems when the electrical load may be much greater later on. With the camera disclosed herein, a timelapse series of photos is taken. A simple example will illustrate. The camera is mounted in an underground electrical vault pointed at high voltage cables and capturing thermal photos at a determined interval across a 24-hour electricity demand/load cycle. During heavy electrical loads, if there is a defect in the cabling or other component, the cabling or component will get hot. Using the thermal camera lens option, the camera could detect these hot spots during peak loads at various times throughout the 24-hour cycle. Furthermore, multiple cameras could be used to monitor multiple different sites across multiple circuits to identify anomalies or failing components more accurately.

The camera disclosed herein is very well-suited to wastewater monitoring applications. The camera is capable of recording high-definition (HD) photos in complete darkness at a resolution of 5 megapixels (2592×1944 pixels). The camera is waterproof, fully submersible and durable. The camera weighs under five pounds. On a single charge the camera can take approximately 6,000 photos. At a photo interval of 5 minutes, this means the camera can go for nearly three weeks before the battery pack module has to be replaced. The battery in the battery pack module can be recharged approximately 300 times. The camera is easy to install, typically with the use of few tools. The clips that hold the battery pack module to the camera module can be moved with a person's finger, allowing for removing and replacing the battery pack module without the use of any tools.

A modular camera includes a battery module, a camera module, and a lens module that can be connected together to make a water-tight camera suitable for monitoring wastewater in wet environments. The camera module includes multiple different external device interfaces that allow the camera to be directly connected to external power, a number of different analog and/or digital sensors, an auxiliary camera, and one or more control outputs. The camera module includes an artificial intelligence (AI) photo analysis tool that analyzes photographs taken by the camera based on an AI model to automatically categorize each photo in near real-time, thereby allowing the camera itself to detect alarm conditions based on an assigned category for a photo, to take action in response to the alarm, and optionally to activate one or more external devices in response to the alarm.

In the description herein, the term "photo" is used as a short form of "photograph." Other terms that are commonly-used in the art are also used, and will be clear to one of ordinary skill in the art.

The claims and disclosure herein support a camera comprising: (A) a battery pack module comprising: a battery; and a first connector that provides a power connection from the battery to a camera module; (B) the camera module comprising: at least one processor; a memory coupled to the at least one processor; camera operational logic residing in the memory and executed by the at least one processor that provides at least one operational mode for the camera module; a battery pack interface on a back portion of the camera module that includes a first water-tight connection for removably coupling the battery pack to the camera module and that further includes a second connector that mates to the first connector in the battery pack when the battery pack is coupled to the camera module to provide the power connection from the battery pack module to the camera module; and a camera face interface on a front portion of the camera module that includes a second water-tight connection for removably coupling a camera face module to the camera module and that further includes a third connector that mates to a fourth connector in the camera face module when the camera face module is coupled to the camera module; and (C) the camera face module comprising: an image sensor array for taking a digital photo; the fourth connector that mates to the third connector on the camera module when the camera face module is coupled to the camera module; at least one lens that directs an image to be taken as a photo onto the image sensor array; and at least one illuminator for optically illuminating a region when taking a digital photo.

The claims and disclosure herein further support a camera comprising: (A) a battery pack module comprising: a battery; a first connector that provides at least one power connection from the battery to a camera module and a plurality of data connections between the battery pack module and the camera module; and a removable media slot coupled to the plurality of data connections, wherein the removable media slot receives and is coupled to a removable media device to which the camera module can store information including a plurality of photos; (B) the camera module comprising: at least one processor; a memory coupled to the at least one processor; at least one external device interface for connecting the camera module to at least one external device that provides input to the camera module; camera operational logic residing in the memory and executed by the at least one processor that provides at least one operational mode for the camera module and that stores the plurality of photos on the removable media device coupled to the removable media slot in the battery pack module, wherein the camera operational logic defines a first frequency for the camera module to take photos and a second frequency for the camera module to take photos that is greater than the first frequency for the camera module to take photos, wherein the camera operational logic monitors the at least one external device interface and determines which of the first frequency and second frequency to use based on input received from the at least one external device interface; a battery pack interface on a back portion of the camera module that includes a first water-tight connection for removably coupling the battery pack to the camera module and that further includes a second connector that mates to the first connector in the battery pack when the battery pack is coupled to the camera module, wherein the removable media slot in the battery pack module is within an area within the first water-tight connection; and a front camera face interface on a front portion of the camera module that includes a second water-tight connection for removably coupling a camera face module to the camera module and that further includes a third connector that mates to a fourth connector in the camera face module when the camera face module is coupled to the camera module; and (C) the camera face module comprising: an image sensor array for taking a digital photo; the fourth connector that mates to the third connector on the camera module; at least one lens that provides optical input onto the image sensor array; and at least one illuminator for optically illuminating a region when taking a digital photo.

The claims and disclosure herein additionally support a camera comprising: (A) a battery pack module comprising: a battery; a first connector that provides at least one power connection from the battery to a camera module and a plurality of data connections between the battery pack module and the camera module; and a removable media slot coupled to the plurality of data connections, wherein the removable media slot receives a removable media device to which the camera module can store a plurality of photo; (B) the camera module comprising: at least one processor; a memory coupled to the at least one processor; at least one external device interface for connecting the camera module to at least one external device that provides input to the camera module; camera operational logic residing in the memory and executed by the at least one processor that provides at least one operational mode for the camera module and that stores the plurality of photos on the removable media device in the removable media slot in the battery pack module, wherein the camera operational logic defines a first frequency for the camera module to take photos and a second frequency for the camera module to take photos that is greater than the first frequency for the camera module to take photos, wherein the camera operational logic monitors the at least one external device interface and determines which of the first frequency and second frequency to use based on input received from the at least one external device interface; an artificial intelligence (AI) photo analysis tool residing in the memory and executed by the at least one processor, wherein the AI photo analysis tool analyzes a plurality of photos taken by the camera module and assigns based on the analysis a category to each of the plurality of photos, wherein the AI photo analysis tool uses at least one AI model to analyze the plurality of photos; at least one wireless interface that allows communication between the camera module and an external device coupled to the at least one wireless interface; a battery pack interface on a back portion of the camera module that includes a first water-tight connection for removably coupling the battery pack to the camera module and that further includes a second connector that mates to the first connector in the battery pack when the battery pack is coupled to the camera module, wherein the removable media slot in the battery pack module is within an area within the first water-tight connection; and a front camera face interface on a front portion of the camera module that includes a second water-tight connection for removably coupling a camera face module to the camera module and that further includes a third connector that mates to a fourth connector in the camera face module when the camera face module is coupled to the camera module; and (C) the camera face module comprising: an image sensor array for taking a digital photo; the fourth connector that mates to the third connector on the camera module; at least one lens that provides optical input onto the image sensor array; and at least one illuminator for optically illuminating a region when taking a digital photo.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A camera comprising:
(A) a battery pack module comprising:
  a battery;
  a mounting flange for mounting the camera in a fixed location;
  a first connector that provides at least one power connection from the battery to a camera module and a plurality of data connections between the battery pack module and the camera module; and
  a removable media slot coupled to the plurality of data connections, wherein the removable media slot receives and is coupled to a removable media device to which the camera module can store information including a plurality of photos;
(B) the camera module comprising:
  at least one processor;
  a memory coupled to the at least one processor;
  camera operational logic residing in the memory and executed by the at least one processor that provides at least one operational mode for the camera module;
  a battery pack interface on the camera module that includes a water-tight connection for removably coupling the battery pack to the camera module and that further includes a second connector that mates to the first connector in the battery pack when the battery pack is coupled to the camera module to provide the power connection from the battery pack module to the camera module and to provide the plurality of data connections between the battery pack module and the camera module, wherein the removable media slot in the battery pack module is inside the water-tight connection when the battery pack is coupled to the battery pack interface; and
  at least one external device interface for connecting the camera module to at least one external device that provides input to the camera module, wherein the at least one external device interface comprises a float switch binary interface that receives a binary signal from a binary float switch wired to the float switch binary interface, wherein the binary float switch is in physical proximity to the fixed location, wherein the binary signal from the binary float switch has a first of two binary values when the float switch is in a first state and has a second of the two binary values when the float switch in in a second state.

2. The camera of claim 1 wherein the level sensor detects level of water in a wastewater pipe.

3. The camera of claim 1 wherein the at least one external device comprises an ultrasonic depth sensor that provides a first input signal to the external device interface, wherein the first input signal is proportional to a depth detected by the ultrasonic depth sensor.

4. The camera of claim 1 wherein the at least one external device comprises a flow sensor that provides a second input signal to the external device interface, wherein the second input signal is proportional to a rate of flow detected by the flow sensor.

5. The camera of claim 1 wherein the camera operational logic defines a first frequency for the camera module to take photos and a second frequency for the camera to take photos that is greater than the first frequency for the camera to take photos, wherein the camera operational logic monitors the at least one external device interface and determines which of the first frequency and second frequency to use based on input received from the at least one external device interface.

6. A camera comprising:
(A) a battery pack module comprising:
  a battery;
  a mounting flange for mounting the camera in a fixed location;
  a first connector that provides at least one power connection from the battery to a camera module and a plurality of data connections between the battery pack module and the camera module; and
  a removable media slot coupled to the plurality of data connections, wherein the removable media slot receives and is coupled to a removable media device to which the camera module can store information including a plurality of photos;
(B) the camera module comprising:
  at least one processor;
  a memory coupled to the at least one processor;
  at least one external device interface for connecting the camera module to at least one external device that provides input to the camera module;
  camera operational logic residing in the memory and executed by the at least one processor that provides at least one operational mode for the camera module and that stores the plurality of photos on the removable media device coupled to the removable media slot in the battery pack module, wherein the camera operational logic defines a first frequency for the camera module to take photos and a second frequency for the camera module to take photos that is greater than the first frequency for the camera module to take photos, wherein the camera operational logic monitors the at least one external device interface and determines which of the first frequency and second frequency to use based on input received from the at least one external device interface; and
  a battery pack interface on a back portion of the camera module that includes a water-tight connection for removably coupling the battery pack to the camera module and that further includes a second connector that mates to the first connector in the battery pack when the battery pack is coupled to the camera module, wherein the removable media slot in the battery pack module is inside the water-tight connection when the battery pack is coupled to the battery pack interface; and
  at least one external device interface for connecting the camera module to at least one external device that provides input to the camera module, wherein the at least one external device interface comprises a float switch binary interface that receives a binary signal from a binary float switch wired to the float switch binary interface, wherein the binary float switch is in physical proximity to the fixed location, wherein the binary signal from the binary float switch has a first of two binary values when the float switch is in a first state and has a second of the two binary values when the float switch in in a second state.

7. The camera of claim 6 wherein the at least one external device comprises a level sensor that provides a binary trip signal when a level detected by the level sensor exceeds a predetermined threshold.

8. The camera of claim 7 wherein the level sensor detects level of water in a wastewater pipe.

9. The camera of claim 6 wherein the at least one external device comprises an ultrasonic depth sensor that provides a first input signal to the external device interface, wherein the first input signal is proportional to a depth detected by the ultrasonic depth sensor.

10. The camera of claim 6 wherein the at least one external device comprises a flow sensor that provides a second input signal to the external device interface, wherein the second input signal is proportional to a rate of flow detected by the flow sensor.

11. The camera of claim 6 further comprising an artificial intelligence (AI) photo analysis tool residing in the memory and executed by the at least one processor, wherein the AI photo analysis tool analyzes a plurality of photos taken by the camera module and assigns based on the analysis a category to each of the plurality of photos.

12. The camera of claim 11 wherein the AI photo analysis tool uses at least one AI model to analyze the plurality of photos.

13. The camera of claim 6 further comprising at least one wireless interface that allows communication between the camera module and an external device coupled to the at least one wireless interface.

14. The camera of claim 6 wherein the at least one external device interface comprises at least one output to an external control device.

15. The camera of claim 14 wherein the external control device is selected from: a gate that directs wastewater flow; and a pump that pumps wastewater.

16. The camera of claim 1 wherein the binary float switch provides the first of the two binary values when a level of water in a wastewater pipe is less than a predetermined threshold.

17. The camera of claim 1 wherein the binary float switch provides the second of the two binary values when the level of water in the wastewater pipe is greater than the predetermined threshold.

18. A camera comprising:
(A) a battery pack module comprising:
 a battery;
 a mounting flange for mounting the camera in a fixed location;
 a first connector that provides at least one power connection from the battery to a camera module and a plurality of data connections between the battery pack module and the camera module; and
 a removable media slot coupled to the plurality of data connections, wherein the removable media slot receives and is coupled to a removable media device to which the camera module can store information including a plurality of photos;
(B) the camera module comprising:
 at least one processor;
 a memory coupled to the at least one processor;
 camera operational logic residing in the memory and executed by the at least one processor that provides at least one operational mode for the camera module;
 a battery pack interface that includes a water-tight connection for removably coupling the battery pack to the camera module and that further includes a second connector that mates to the first connector in the battery pack when the battery pack is coupled to the camera module to provide the power connection from the battery pack module to the camera module and to provide the plurality of data connections between the battery pack module and the camera module, wherein the removable media slot in the battery pack module is inside the water-tight connection when the battery pack is coupled to the battery pack interface; and
 at least one external device interface for connecting the camera module to at least one external device that provides input to the camera module, wherein the at least one external device comprises a level sensor wired to the at least one external device interface, wherein the level sensor detects a level of wastewater in a wastewater pipe and is in physical proximity to the fixed location, wherein the level sensor provides a binary signal with a first of two binary values to the at least one external device interface when the level of wastewater in the wastewater pipe detected by the level sensor is less than a predetermined threshold and provides a second of the two binary values to the at least one external interface when the level of wastewater in the wastewater pipe detected by the level sensor exceeds the predetermined threshold.

* * * * *